(12) United States Patent
Lian et al.

(10) Patent No.: US 10,722,741 B2
(45) Date of Patent: Jul. 28, 2020

(54) AUTOMATICALLY GENERATING FIRE-FIGHTING FOAMS TO COMBAT LI-ION BATTERY FAILURES

(71) Applicant: International Business Machines Corporation, Armonk, NY (US)

(72) Inventors: Guoda Lian, Poughkeepsie, NY (US); James A. O'Connor, Ulster Park, NY (US); Madhana Sunder, Wappingers Falls, NY (US); Conor R. Thomas, Woodbury, CT (US)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 15/828,605

(22) Filed: Dec. 1, 2017

(65) Prior Publication Data

US 2019/0168038 A1   Jun. 6, 2019

(51) Int. Cl.
| | | |
|---|---|---|
| *A62C 3/00* | (2006.01) | |
| *A62C 3/16* | (2006.01) | |
| *A62D 1/02* | (2006.01) | |
| *H01M 2/10* | (2006.01) | |
| *H01M 10/42* | (2006.01) | |
| *H01M 2/36* | (2006.01) | |

(Continued)

(52) U.S. Cl.
CPC .......... *A62C 3/16* (2013.01); *A62C 5/02* (2013.01); *A62C 35/10* (2013.01); *A62D 1/0071* (2013.01); *H01M 2/1016* (2013.01); *H01M 2/36* (2013.01); *H01M 10/42* (2013.01)

(58) Field of Classification Search
CPC ........... A62C 5/02; A62C 5/022; A62C 5/024; A62C 5/027; A62C 5/006; A62C 19/00; A62C 35/08; A62C 37/04; A62C 37/08; A62C 37/28; A62C 99/0036
USPC ........................................................ 239/309
See application file for complete search history.

(56) References Cited

U.S. PATENT DOCUMENTS

| | | | | |
|---|---|---|---|---|
| 366,901 | A * | 7/1887 | Van Houten | ........... A62C 35/08 169/28 |
| 648,371 | A * | 5/1900 | Allen | ..................... A62C 35/08 169/28 |

(Continued)

FOREIGN PATENT DOCUMENTS

| | | |
|---|---|---|
| CN | 106356485 A | 1/2017 |
| CN | 106621114 A | 5/2017 |
| DE | 102011009696 A1 | 8/2012 |

OTHER PUBLICATIONS

Appendix P, List of IBM Patents or Patent Applications Treated as Related, 2 pages, dated Feb. 1, 2018.

(Continued)

*Primary Examiner* — Viet Le
(74) *Attorney, Agent, or Firm* — Michael A. Petrocelli

(57) ABSTRACT

An apparatus for automatically generating a fire-fighting foam at elevated temperatures is provided. The apparatus includes a container sized to hold at least one battery. Water is stored within the container. One or more cartridges made, at least in part, of a temperature-dependent breakdown material are stored within the container. The one or more cartridges contain a foaming agent. Heat generated by a failing battery causes the temperature-dependent breakdown material to fail such that the foaming agent is released from at least one cartridge to mix with the water stored within the container.

13 Claims, 13 Drawing Sheets

(51) Int. Cl.
*A62C 5/02* (2006.01)
*A62C 35/10* (2006.01)

(56) References Cited

U.S. PATENT DOCUMENTS

| | | | | |
|---|---|---|---|---|
| 695,847 | A * | 3/1902 | Van Falkenburg et al. | A62C 35/08 169/28 |
| 744,061 | A * | 11/1903 | Fry | A62C 35/08 169/28 |
| 1,832,056 | A * | 11/1931 | Spencer | A47G 29/06 169/26 |
| 1,904,828 | A * | 4/1933 | Green | A62C 37/10 169/39 |
| 2,908,334 | A * | 10/1959 | Duggan | A62C 5/002 169/44 |
| 3,019,843 | A * | 2/1962 | Powell | A62C 3/06 169/56 |
| 3,604,511 | A * | 9/1971 | Griffith | A62C 35/08 169/28 |
| 3,796,377 | A * | 3/1974 | O'Hare | B05B 7/0425 239/428.5 |
| 4,250,967 | A * | 2/1981 | Horwinski | A24F 19/09 169/11 |
| 4,322,292 | A * | 3/1982 | Knox | E03C 1/084 239/428.5 |
| 4,330,086 | A * | 5/1982 | Nysted | B05B 7/0068 169/5 |
| 4,411,318 | A * | 10/1983 | Zeischegg | A62C 3/00 169/26 |
| 4,760,886 | A * | 8/1988 | Sassier | A62C 35/08 169/28 |
| 4,779,683 | A * | 10/1988 | Enk | A62C 35/02 169/28 |
| 4,805,700 | A * | 2/1989 | Hoover | A62C 31/12 169/14 |
| 5,038,866 | A * | 8/1991 | Kern | A62C 35/08 169/26 |
| 5,050,683 | A * | 9/1991 | Sayles | A62C 35/08 169/35 |
| 5,052,585 | A * | 10/1991 | Bolduc | B65D 83/687 222/1 |
| 5,056,603 | A * | 10/1991 | Parkinson | A62C 3/00 169/26 |
| 5,113,945 | A * | 5/1992 | Cable | A62C 5/02 169/14 |
| 5,226,555 | A * | 7/1993 | Kovaleski | B65D 5/566 206/521 |
| 5,330,105 | A * | 7/1994 | Kaylor | A62C 31/12 137/889 |
| 5,337,913 | A * | 8/1994 | Fukuda | E05C 19/06 220/326 |
| 5,423,385 | A * | 6/1995 | Baratov | A62C 5/00 169/12 |
| 5,425,426 | A * | 6/1995 | Baratov | A62D 1/0014 169/12 |
| 5,441,114 | A * | 8/1995 | Spector | A62C 5/006 169/14 |
| 5,585,028 | A | 12/1996 | Berger | |
| 5,588,493 | A * | 12/1996 | Spector | A62C 99/0018 169/46 |
| 5,718,294 | A * | 2/1998 | Billiard | A62C 35/08 169/61 |
| 5,779,158 | A * | 7/1998 | Baker | B05B 7/0018 169/15 |
| 5,826,664 | A * | 10/1998 | Richardson | A62C 35/08 169/46 |
| 5,996,700 | A * | 12/1999 | Sulmone | A62C 5/02 169/15 |
| 6,189,625 | B1 * | 2/2001 | Hopkins | A62C 13/64 169/30 |
| 6,217,788 | B1 * | 4/2001 | Wucherer | A62C 5/006 149/17 |
| 6,241,164 | B1 * | 6/2001 | Wolfe | A62C 5/022 169/27 |
| 6,413,668 | B1 * | 7/2002 | Sandberg | H01M 2/0207 429/166 |
| 6,513,602 | B1 * | 2/2003 | Lewis | A62C 5/006 149/19.1 |
| 6,622,801 | B1 * | 9/2003 | Rondino | A62C 5/006 169/71 |
| 7,070,003 | B1 * | 7/2006 | Smith | A62C 3/00 169/16 |
| 7,121,354 | B2 * | 10/2006 | Munson, Jr. | A62C 35/023 169/47 |
| 7,147,061 | B2 * | 12/2006 | Tsutaoka | A62C 8/005 169/28 |
| 7,232,197 | B2 * | 6/2007 | Davis | E05G 1/024 312/409 |
| 7,385,480 | B2 * | 6/2008 | Fitzpatrick | A62C 99/0045 169/58 |
| 8,146,674 | B2 * | 4/2012 | Lee | G21F 7/00 169/11 |
| 8,159,356 | B2 * | 4/2012 | Farrell | H01L 35/32 340/577 |
| 8,408,322 | B2 * | 4/2013 | Blau | A62D 1/06 169/30 |
| 8,540,421 | B2 * | 9/2013 | Ahlers | G01M 99/002 340/577 |
| 8,544,670 | B2 * | 10/2013 | Brilmyer | G11B 33/1406 109/33 |
| 8,733,465 | B1 * | 5/2014 | Flood | A62C 3/16 169/26 |
| 8,939,225 | B2 * | 1/2015 | Cox | A62C 5/006 169/72 |
| 9,339,671 | B1 * | 5/2016 | Raj | A62C 3/08 |
| 9,415,248 | B2 * | 8/2016 | Donahue | A62C 3/16 |
| 9,421,405 | B1 * | 8/2016 | Murray | H01H 69/02 |
| 9,520,619 | B2 * | 12/2016 | Bianchi | B65D 81/2076 |
| 9,550,195 | B1 * | 1/2017 | Cao | B05B 1/18 |
| 9,578,942 | B2 * | 2/2017 | Brilmyer | A45C 11/00 |
| 9,586,067 | B1 * | 3/2017 | Kirkbride | H01M 10/0525 |
| 9,597,535 | B2 * | 3/2017 | Knijnenburg | A62C 3/08 |
| 9,604,081 | B1 * | 3/2017 | Scarola | A62C 37/08 |
| 9,643,036 | B2 * | 5/2017 | Burkett | A62C 2/06 |
| 9,722,163 | B2 * | 8/2017 | Firdosy | H01L 35/08 |
| 9,871,237 | B2 * | 1/2018 | Lu | H01M 2/1055 |
| 9,956,445 | B2 * | 5/2018 | Enk, Sr. | A62C 5/02 |
| 10,022,735 | B2 * | 7/2018 | Cao | B05B 1/341 |
| 2003/0062175 | A1 * | 4/2003 | Olander | A62C 5/00 169/51 |
| 2003/0066660 | A1 * | 4/2003 | Horwell | A62C 8/06 169/50 |
| 2005/0126794 | A1 * | 6/2005 | Palmer | A62C 3/0214 169/16 |
| 2005/0139365 | A1 * | 6/2005 | Richardson | A62C 5/006 169/43 |
| 2005/0257937 | A1 * | 11/2005 | Fabre | A62C 5/006 169/5 |
| 2006/0138251 | A1 * | 6/2006 | Stahl, Sr. | A62C 2/065 239/309 |
| 2007/0131794 | A1 * | 6/2007 | Lai | B05B 7/2472 239/304 |
| 2007/0163787 | A1 * | 7/2007 | Posson | A62C 5/006 169/85 |
| 2007/0181715 | A1 * | 8/2007 | Hubert | A62C 5/02 239/589 |
| 2007/0246233 | A1 * | 10/2007 | Johnson | A62C 35/68 169/37 |
| 2008/0053667 | A1 * | 3/2008 | Rousseau | A62C 13/70 169/51 |
| 2008/0135266 | A1 * | 6/2008 | Richardson | A62C 99/0018 169/46 |
| 2008/0190627 | A1 * | 8/2008 | Koelewijn | A62C 5/006 169/46 |
| 2008/0289832 | A1 * | 11/2008 | Schimpf | A62C 35/08 169/51 |
| 2008/0289837 | A1 * | 11/2008 | Rouosseau | A62C 13/66 169/88 |

(56) References Cited

U.S. PATENT DOCUMENTS

| | | | | |
|---|---|---|---|---|
| 2009/0014188 A1* | 1/2009 | Hesch | ............... | A62C 3/16 169/48 |
| 2009/0301738 A1* | 12/2009 | Gross | ............... | A62C 5/006 169/30 |
| 2009/0321094 A1* | 12/2009 | Thomas | ............... | A62C 3/025 169/70 |
| 2010/0012335 A1* | 1/2010 | Popp | ............... | A62C 3/00 169/46 |
| 2010/0032175 A1* | 2/2010 | Boyd | ............... | A62C 3/02 169/44 |
| 2011/0079456 A1* | 4/2011 | Borumand | ............... | A62C 2/06 180/68.5 |
| 2011/0262801 A1* | 10/2011 | Schwab | ............... | B60K 1/04 429/163 |
| 2011/0308821 A1* | 12/2011 | Katsuraku | ............... | A62C 5/02 169/28 |
| 2012/0037717 A1* | 2/2012 | Zakhmatov | ............... | A62C 3/0242 239/1 |
| 2012/0138319 A1* | 6/2012 | Demmitt | ............... | A62C 3/025 169/28 |
| 2012/0211246 A1* | 8/2012 | Zlatintsis | ............... | A62C 13/66 169/85 |
| 2012/0231317 A1* | 9/2012 | Shimizu | ............... | H01M 2/105 429/120 |
| 2012/0273240 A1* | 11/2012 | Smith | ............... | A62C 37/48 169/70 |
| 2013/0048317 A1* | 2/2013 | Charlton | ............... | A62C 3/025 169/46 |
| 2013/0112439 A1* | 5/2013 | Cordani | ............... | A62C 3/16 169/44 |
| 2013/0118765 A1* | 5/2013 | Smith | ............... | A62C 37/36 169/61 |
| 2013/0175058 A1* | 7/2013 | Williams | ............... | A62C 35/08 169/46 |
| 2013/0199806 A1* | 8/2013 | Zimmerman | ............... | B64D 1/18 169/53 |
| 2013/0206428 A1* | 8/2013 | Phillips | ............... | A62C 3/065 169/16 |
| 2013/0220651 A1* | 8/2013 | Rachidi | ............... | A62C 13/66 169/85 |
| 2014/0196916 A1* | 7/2014 | Lee | ............... | A62C 5/006 169/28 |
| 2014/0196918 A1* | 7/2014 | Effenberger | ............... | A62C 13/003 169/85 |
| 2014/0209332 A1* | 7/2014 | Burkett | ............... | A62C 2/06 169/49 |
| 2014/0216766 A1* | 8/2014 | Qiang | ............... | A62C 13/76 169/28 |
| 2014/0352988 A1* | 12/2014 | Aldino | ............... | A62C 35/08 169/48 |
| 2015/0060093 A1* | 3/2015 | Bongiornio | ............... | A62C 13/72 169/85 |
| 2015/0069068 A1* | 3/2015 | Hariram | ............... | A62C 3/16 220/560.01 |
| 2015/0283523 A1* | 10/2015 | Clausen | ............... | B01F 5/0451 366/152.1 |
| 2015/0343246 A1* | 12/2015 | Santos Gomez | ............... | B29C 70/44 156/382 |
| 2015/0357541 A1* | 12/2015 | Firdosy | ............... | H01L 35/08 136/205 |
| 2016/0175628 A1* | 6/2016 | Nadeau | ............... | A62C 35/023 169/46 |
| 2016/0263410 A1* | 9/2016 | Enk, Sr. | ............... | A62C 5/02 |
| 2016/0263411 A1* | 9/2016 | Chung | ............... | A62C 13/003 |
| 2016/0303409 A1* | 10/2016 | Smith | ............... | A62C 35/08 |
| 2016/0315361 A1* | 10/2016 | Petzinger | ............... | H01M 2/1094 |
| 2016/0346578 A1* | 12/2016 | Szocs | ............... | A62C 5/02 |
| 2016/0361580 A1* | 12/2016 | Leahy | ............... | A62C 3/04 |
| 2017/0043194 A1* | 2/2017 | Ling | ............... | H01M 10/42 |
| 2017/0077379 A1* | 3/2017 | Firdosy | ............... | H01L 35/08 |
| 2017/0087393 A1* | 3/2017 | Butler | ............... | A62C 3/0242 |
| 2017/0155103 A1* | 6/2017 | Pasewald | ............... | A62C 3/06 |
| 2018/0147431 A1* | 5/2018 | Chattaway | ............... | A62C 13/78 |
| 2018/0147432 A1* | 5/2018 | An | ............... | E04B 5/04 |
| 2018/0243596 A1* | 8/2018 | Kim | ............... | A62C 35/58 |
| 2018/0355989 A1* | 12/2018 | Bedell | ............... | F16K 27/12 |
| 2019/0168037 A1* | 6/2019 | Lian | ............... | A62C 3/16 |
| 2019/0168038 A1* | 6/2019 | Lian | ............... | A62C 3/16 |
| 2019/0185163 A1* | 6/2019 | Thomas | ............... | B64C 15/14 |
| 2019/0290948 A1* | 9/2019 | Mahrt | ............... | A62C 5/022 |
| 2019/0348649 A1* | 11/2019 | Ryu | ............... | A62C 37/08 |
| 2019/0366138 A1* | 12/2019 | Mull | ............... | A62C 35/68 |

OTHER PUBLICATIONS

Lian et al., "Automatically Generating Fire-Fighting Foams to Combat Li-ion Battery Failures", U.S. Appl. No. 15/828,482, filed Dec. 1, 2017, 65 pages.

Yim et al., "Self-Extinguishing Lithium Ion Batteries Based on Internally Embedded Fire-Extinguishing Microcapsules with Temperature-Responsiveness", Nano Letters, ACS Publications, © 2015 American Chemical Society, Received: Mar. 25, 2015, Revised: Jun. 18, 2015, Published: Jul. 15, 2015, Nano Lett. 2015, 15, pp. 5059-5067.

"Air Carrier Information", Federal Aviation Administration, Page last modified: Dec. 6, 2016, 4 pages, printed on Aug. 9, 2017, https://www.faa.gov/about/office_org/headquarters_offices/ash/ash_programs/hazmat/aircarrier_info/>.

"Hot Stop "L" Lithium Ion Fire Containment Kit—Laptop", All Hands® Fire Equipment, printed on Aug. 9, 2017, 2 pages, <http://www.allhandsfire.com/Hot-Stop-L-Fire-Containment-Bag-Zipper>.

"Basco 2 Inch Hex Head VGII Plug", opentip.com, 4 pages, printed on Nov. 29, 2017, Copyright © 2004-2017 Opentip.com, <https://www.opentip.com/product.php?products_id=7474605&ats=product_landing>.

"Fire Extinguisher, Firex", Albkos International, 2 pages, printed on Nov. 29, 2017, <http://www.albkos-int.com/en/fire-extinguishers/111-fire-extinguisher-firex.html#.Wh7wR6JuykK>.

"Hybrid Thermoelectric Power Modules PbTe-BiTe", TEC, Thermoelectric Gencell Technology, 4 pages, printed on Nov. 29, 2017, <http://thermoelectric-generator.com/hybrid-thermoelectric-power-modules-pbte-bite/>.

"Make an Ultra Simple High Voltage Generator", by Plasmana in electronics, instructables, 12 pages, printed on Nov. 29, 2017, <http://www.instructables.com/id/Make-an-Ultra-Simple-High-Voltage-Generator/>.

"Low Melt Eutectic Alloys", NEY, Quality Alloys Since 1867, 6 pages, printed on Nov. 29, 2017, < http://www.neymetals.com/product/low-melt-eutectic-alloys/>.

"Pressure of a Fire Extinguisher", Victoria Poon—2005, Edited by Glenn Elert, Written by his students, 1 page, printed on Nov. 29, 2017, <https://hypertextbook.com/facts/2005/VictoriaPoon.shtml>.

* cited by examiner

AUTOMATICALLY GENERATING FIRE-FIGHTING FOAMS TO COMBAT LI-ION BATTERY FAILURES

TECHNICAL FIELD

The present invention relates generally to the field of fire-fighting equipment and, more particularly, to automatically generating fire-fighting foam to combat Li-ion battery failures.

BACKGROUND

Lithium-ion (Li-ion) batteries are an advantageous energy storage medium because they are rechargeable and generally have high energy density and high power density. Li-ion batteries are commonly found in hand-held electronic devices, such as smartphones, tablets, laptops, power tools, and various other types of electronic devices. Electric vehicles also represent a significant use of Li-ion batteries. Generally, a Li-ion battery includes a carbon-based electrode, a metal-oxide electrode, and a lithium salt that is dissolved in an organic solvent as an electrolyte.

Li-ion batteries are likely to fail via thermal runaway if short-circuited, overheated, or overcharged. Short-circuiting, for example, can occur via dendritic growth between the electrodes or mechanical deformation that brings the electrodes into physical contact. Thermal runaway can rupture Li-ion battery cells and result in fire and/or an explosion. Fire is a significant concern in that many of the organic solvents used in the electrolytic solution are flammable, metal-oxide electrodes can decompose and produce oxygen at high temperatures, and any deposits of metallic lithium will burn in the presence of oxygen and/or water. Concerns over the safety of transporting Li-ion batteries has led to their regulation.

SUMMARY

According to one embodiment of the present invention, an apparatus for automatically generating a fire-fighting foam at elevated temperatures is provided. The apparatus comprising: a container sized to hold at least one battery; water stored within the container; and one or more cartridges stored within the container, the one or more cartridges made, at least in part, of a temperature-dependent breakdown material and containing a foaming agent, wherein heat generated by a failing battery is sufficient to cause the temperature-dependent breakdown material to fail such that the foaming agent is released from at least one cartridge to mix with the water stored within the container.

According to another embodiment of the present invention, an apparatus for automatically generating fire-fighting foams at elevated temperatures. The apparatus comprising: a flexible and resealable container sized to hold at least one battery and having a removable top portion; water stored within the container; and one or more cartridges stored within the container and in contact, at least in part, with the water, the one or more cartridges made, at least in part, of a temperature-dependent breakdown material and containing a foaming agent, wherein heat generated by a failing battery is sufficient to cause the temperature-dependent breakdown material to fail such that the foaming agent is released to mix with the water stored within the container.

According to another embodiment of the present invention, an apparatus for automatically applying fire-fighting foams at elevated temperatures is provided. The apparatus comprising: a pressure vessel; a nozzle having an interior throat surface that is attached to the pressure vessel; and an obturator made, at least in part, of a temperature-dependent breakdown material, wherein the obturator abuts, at least in part, the interior throat surface of the nozzle and obstructs the nozzle such that contents of the pressure vessel cannot pass through nozzle below a threshold temperature.

DETAILED DESCRIPTION

Figure 1A:
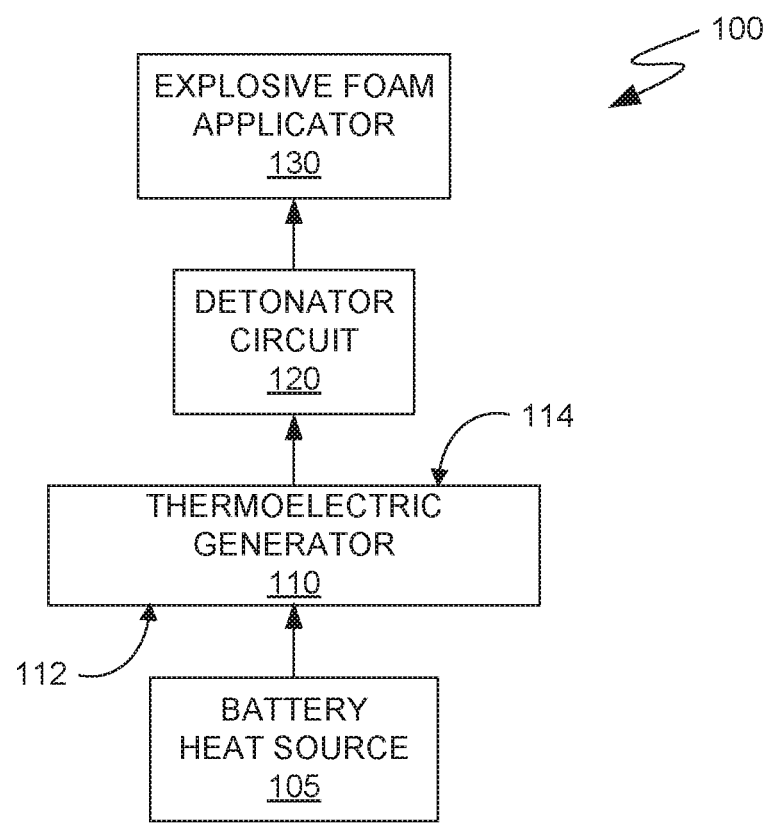
FIG. 1A is a functional block diagram illustrating a system for automatically generating a fire-fighting foam utilizing an explosive foam generator, in accordance with an embodiment of the present invention.

Embodiments of the present invention recognize that lithium-containing batteries are a growing and increasingly indispensable form of electrical energy storage and that the transportation of which presents significant engineering challenges. The high energy and power density and low weight of these batteries make them attractive power sources for ground vehicles, seafaring ships and boats, aircraft, and spacecraft. Additionally, these batteries are ubiquitous in the form of power sources for portable electronic devices that are carried by the crew and passengers of such vehicles and/or as cargo carried by such vehicles. While generally safe, the high energy density of lithium-containing batteries can threaten the structural integrity of such vehicles and the wellbeing of any passengers or crew when one or more batteries fail. Failing Li-ion batteries can generate temperatures up to 500 degrees Celsius. For example, embodiments of the present invention recognize that a fire resulting from a battery failure aboard an aircraft or spacecraft can quickly degrade a craft's structural integrity and consequently its airworthiness and/or space-worthiness, and therefore, such fires must be suppressed and/or contained as quickly as possible.

Additionally, embodiments of the present invention recognize that applying a fire-fighting foam to failing and/or burning batteries can moderate thermal runaway by extracting heat from failing components and/or suppress or prevent further combustion by removing heat from combustible components and starving combustible components of oxygen. In relatively small, enclosed spaces, such as the cabin, crew quarters, or cargo hold of an aircraft or spacecraft, it is also advantageous to contain fire and heat generated by battery failures as quickly as possible and to the maximum extent possible to minimize the exposure of passengers and/or crew to smoke and other combustion products in addition to protecting the structural integrity of the craft. On the other hand, embodiments of the present invention recognize that it is advantageous to reduce the likelihood of inadvertently triggering a suppression/containment system. Furthermore, providing a simple yet effective suppression/containment system can minimize costs and foster adoption of equipment and procedures for combating Li-ion battery failures.

Embodiments of the present invention respectively provide devices and systems for automatically generating fire-fighting foams utilizing automatic triggering mechanisms. While embodiments of the present invention are discussed with respect to combating failing Li-ion batteries, the invention described herein is not to be construed as limited thereto. Embodiments of the invention can be utilized to combat other forms of exothermic reactions that generate sufficient heat to activate the triggering mechanisms described herein. It is to be further understood that these embodiments are described only for the purpose of illustration and to help those skilled in the art to understand and implement the present invention, without suggesting any limitation as to the scope of the invention. The invention described herein can be implemented in various manners other than the ones explicitly described herein.

As used herein, a list of alternatives such as "at least one of A, B, and C" should be interpreted to mean "at least one A, at least one B, at least one C, or any combination of A, B, and C."

Additionally, the phrase "based on" should be interpreted to mean "based, at least in part, on."

The term "exemplary" means of or relating to an example and should not be construed to indicate that any particular embodiment is preferred relative to any other embodiment.

Embodiments of the present invention will now be described in detail with reference to the Figures.

Figure 1B:
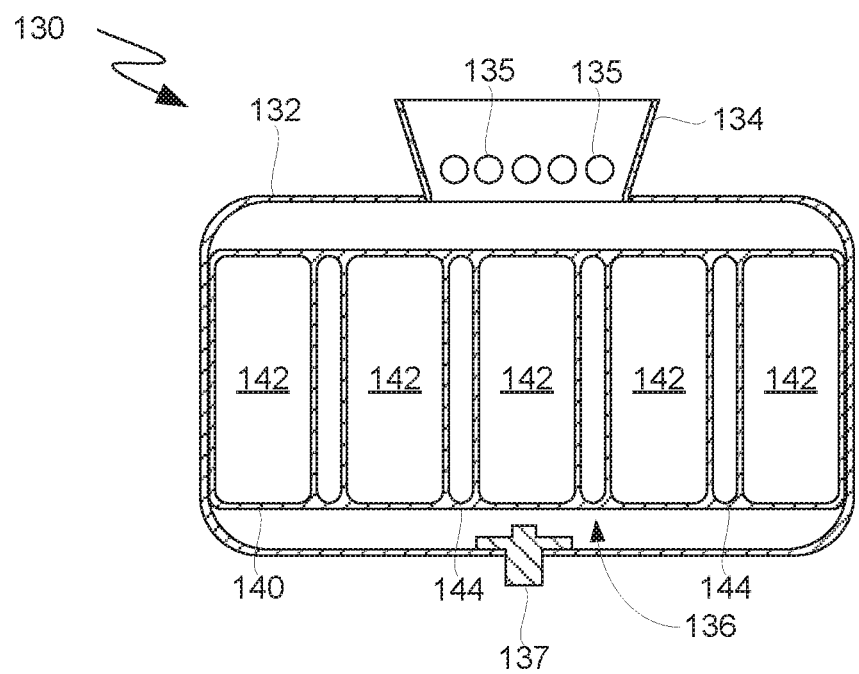
FIG. 1B is a cross-sectional schematic diagram of an explosive foam applicator, in accordance with an embodiment of the present invention.

FIG. 1A is a functional block diagram illustrating a system for automatically generating a fire-fighting foam utilizing an explosive foam generator, in accordance with an embodiment of the present invention. More specifically, FIG. 1 is a functional block diagram illustrating explosively-driven foam application system 100. Explosively-driven foam application system 100 includes battery heat source 105, thermoelectric generator 110, detonator circuit 120, and explosive foam applicator 130. Battery heat source 105 is in thermal contact with hot surface 112 of thermoelectric generator 110. Thermoelectric generator 110 is electrically connected to detonator circuit 120, and detonator circuit 120 is communicatively and/or electrically connected to explosive foam applicator 130 such that detonator circuit 120 can send a signal to explosive foam applicator 130 that causes, at least in part, a detonation of a propelling charge of explosive foam applicator 130. Explosive foam applicator 130 is described in greater detail with respect to FIG. 1B.

In various embodiments, battery heat source 105 represents one or more Li-ion batteries. In other embodiments, however, battery heat source 105 represents one or more batteries of a different chemical makeup (e.g., nickel-metal hydride batteries, nickel-zinc batteries, etc.). In yet other embodiments, battery heat source 105 represents another type of energy source, such as a fuel cell. In general, battery heat source 105 represents a source of heat that is sufficient, if not suppressed or eliminated, to cause, or have the potential to cause, combustion of the heat source and/or surrounding materials and/or produces sufficient heat to compromise, or have the potential to compromise, the structural integrity of surrounding structures (e.g., the airframe of an aircraft or spacecraft or hull of a boat or ship).

Thermoelectric generator 110 represents a device that converts heat from battery heat source 105 into electricity used to drive detonator circuit 120. In some embodiments, for example, thermoelectric generator 110 is a solid-state generator in which an array of alternating p-doped and n-doped elements of one or more semiconductors are electrically connected in series and thermally connected in parallel such that the array is defined, at least in part, by two large, planar parallel surfaces. Hot surface 112 represents one such surface, and cold surface 114 represents another, opposed surface. Hot surface 112 is in thermal contact with battery heat source 105 such that heat from battery heat source 105 flows into thermoelectric generator 110 via hot surface 112 and is removed from thermoelectric generator 110 via cold surface 114. A difference in temperature between hot surface 112 and cold surface 114 causes an electrical current to flow in the thermoelectric materials due to the Seebeck effect, as will be understood by persons having ordinary skill in the art.

Thermoelectric generator 110 can incorporate various thermoelectric materials and various dopants as functional materials between hot surface 112 and cold surface 114 (e.g., bismuth telluride and/or lead telluride). Persons having ordinary skill in the art will further understand that many thermoelectric materials exist and that these materials have various properties with respect to electrical conductivity, thermal conductivity, and Seebeck coefficient, amongst others, that can affect a thermoelectric generator's power factor, efficiency, and operating temperature range. Embodiments of the present invention recognize that it is advantageous to optimize thermoelectric generator 110 via thermoelectric material selection such that thermoelectric generator 110 is optimized to generate a current between a threshold hot-surface temperature (i.e., a threshold temperature of battery heat source 105) and a trigger temperature (i.e., a temperature at which detonator circuit 120 triggers a propelling charge). Similarly, embodiments of the present invention recognize that it is advantageous to optimize thermoelectric generator 110 via thermoelectric generator design, and therefore, in addition to embodiments that utilize single-stage thermoelectric generators, various embodiments of the present invention utilize segmented thermoelectric generator designs and/or cascaded thermoelectric generator designs to optimize thermoelectric generator 110 for an operating temperature range and/or trigger temperature. Some embodiments of the present invention utilize a cascaded lead telluride/bismuth telluride design for thermoelectric generator 110 to optimize thermoelectric generator 110 for operation (i.e., to provide an electric current to detonator circuit 120) between approximately 200 degrees Celsius and approximately 360 degrees Celsius (392 to 680 degrees Fahrenheit).

Embodiments of the present invention recognize that thermoelectric generators are advantageous in that they are generally mechanical simple due to a lack of moving parts and are more reliable than more mechanically complex types of electric generators. The present invention, however, is not be construed as being limited to the use of thermoelectric generators. For example, another form of heat engine, such as a stirling-cycle engine, can be used to provide electrical power to detonator circuit 120). In addition, explosively-driven foam application system 100, in various embodiments, can be integrated with a power system of a host vehicle or container. In, yet other embodiments, explosively-driven foam application system 100 can utilize, as a primary and/or secondary power source, an independent power supply (e.g., a backup battery) that does not depend on battery heat source 105 and/or a power system of a host vehicle or container to provide an electrical current. Similarly, various embodiments of the present invention can utilize an independent measurement of the temperature of battery heat source 105 (e.g., a thermocouple temperature sensor) as a primary or secondary (i.e., a backup) temperature sensor.

Detonator circuit 120 represents one or more electrical devices that detonates a propelling charge of explosive foam applicator 130 based on heat generated by battery heat source 105. For example, thermoelectric generator 110 can power detonator circuit 120 utilizing heat generated by battery heat source 105 and detonator circuit 120. Persons having ordinary skill in the art will understand that thermoelectric generators can produce a current having a temperature-dependent voltage from a temperature differential, such as the temperature differential between hot surface 112 and cold surface 114. Therefore, detonator circuit 120 can infer the temperature at hot surface 112, and thus the temperature of battery heat source 105, based, at least in part, on the voltage of the current generated by thermoelectric generator 110. In the embodiment depicted in FIG. 1A, detonator circuit 120 incorporates a voltmeter, ammeter, multimeter, or another instrument for measuring electrical properties from which the temperature at hot surface 112 can be inferred. Detonator circuit 120 also stores and executes logic to determine the temperature at hot surface 112 and to detonate the propelling charge of explosive foam applicator 130 at a specified threshold temperature of hot surface 112 (e.g., a temperature or range of temperatures between approximately 150 degrees Celsius and 250 degrees Celsius), as described herein.

To more accurately determine the temperature of battery heat source 105, some embodiments of detonator circuit incorporate one or more temperature sensors (e.g., one or more thermocouples) to measure an ambient temperature around explosive foam applicator 130 in order to advantageously compensate for heat within the ambient environment that is not reflected in the temperature differential across hot surface 112 and cold surface 114. In other embodiments, detonator circuit 120 incorporates logic that represents assumptions about the temperature of the ambient environment based, for example, on the temperature differential across hot surface 112 and cold surface 114, the lengths of periods of time corresponding to various temperature differentials across hot surface 112 and cold surface 114, and various other factors relating to the production and dissipation of heat within the ambient environment.

In various embodiments, detonator circuit 120 represents processor(s), cache(s), memories, persistent storage, input/output (I/O) interface(s), and a bus for passing data and/or control information between the aforementioned components. Memory, cache(s), and persistent storage incorporated in detonator circuit 120 are computer readable storage media and can include any suitable volatile or non-volatile computer readable storage media. Program instructions and data used to practice embodiments of the present invention can be stored in persistent storage and/or in memory for execution by one or more processor via respective cache(s). In some embodiments, for example, detonator circuit 120 represents a microcontroller that can be incorporated into thermoelectric generator 110 or explosive foam applicator 130 and that is programmed with firmware that provides the functionality attributed to detonator circuit 120. Logic to provide the functionality attributed to detonator circuit 120 can also be provided via program instructions stored on removable storage media, such as optical and magnetic disks, thumb drives, and smart cards, or provided via wired or wireless connection and respective hardware and communication protocols, which may facilitate modification of the logic (e.g., to reprogram detonator circuit 120 to detonate the propelling charge at a different trigger temperature). In other embodiments, detonator circuit 120 represents an electronic device that is discrete from thermoelectric generator 110 and explosive foam applicator 130. In some embodiments, for example, detonator circuit 120 includes, or is incorporated into, a display for presenting information, including the temperature at hot surface 112 and/or whether or not detonator circuit 120 has detonated explosive foam applicator 130, and is provided with I/O interface(s) for arming/disarming detonator circuit 120 and/or setting the temperature at which detonator circuit 120 detonates the propelling charge of explosive foam applicator 130. Detonator circuit 120 can, in various embodiments, transmit information such information and accept such inputs via various wired and wireless communication protocols know in the art.

FIG. 1B is a cross-sectional schematic diagram of an explosive foam applicator, in accordance with an embodiment of the present invention. More specifically, FIG. 1B depicts an embodiment of explosive foam applicator 130 in which two-component foam cartridge 140 and propelling charge 136 reside within an interior of chamber 132 and aspirating nozzle 134 is in communication with the interior of chamber 132. Explosive foam applicator 130 and its components are drawn so as to facilitate explanation of various aspects of the embodiments of the present inventions and are not necessarily drawn to scale. Persons of ordinary skill in the art will understand that two-component foam cartridge 140 can be sized so as to produce a specified amount of fire-fighting foam and that chamber 132, aspirating nozzle 134, and propelling charge 136 should be sized to generate and contain pressure that is sufficient to substantially rupture two-component foam cartridge 140 and apply, via aspirating nozzle 134, a resulting fire-fighting foam to failing batteries (e.g., battery heat source 105).

In the embodiment, depicted in FIG. 1B, propelling charge 136 represents a chemical propellant that is triggered (e.g., detonates and/or burns) when detonator circuit 120 activates trigger mechanism 137. A first portion of trigger mechanism 137 can be located in the interior of chamber 132 and include elements for detonating or igniting propelling charge 136, and a second portion of trigger mechanism can pass through the wall of chamber 132 to receive signals from detonator circuit 120. Trigger mechanism 137 can, for example, represent a spark-gap igniter or an electrically resistive igniter. In some embodiments, detonator circuit 120 and/or trigger mechanism 137 include elements to step-up the voltage and/or current generated by thermoelectric generator 110 to activate trigger mechanism 137 and detonate or ignite propelling charge 136 (e.g., a spark igniter may require a higher voltage and a resistive igniter may require a higher current than that provided by thermoelectric generator 110). Sodium azide and nitroguanidine are two examples chemical propellants. Sodium azide and nitroguanidine respectively decompose at approximately 275 degrees Celsius and approximately 250 degrees Celsius. These and similar compounds are advantageous in that they provide safety and redundancy in that they are not flammable but detonate (i.e., decompose) at relatively low temperatures in the event that detonator circuit 120 and/or thermoelectric generator 110 fail to function correctly, which may advantageously apply the fire-fighting foam before the effects of thermal runaway/combustion become unmanageable. Embodiments of the present invention, however, are not limited to such chemical propellants. In other embodiments propelling charge 136 represent a quantity of compressed gas within a pressure vessel and trigger mechanism 137 represents an actuator-controlled valve, rupturing charge, or another release mechanism that detonator circuit 120 can activate to release the pressurized gas when appropriate.

Two-component foam cartridge 140 is a multi-cellular structure that contains a two-component fire-fighting foam. Persons having ordinary skill in the art will understand the fire-fighting foams are generally aqueous foams made up of water, a surfactant, and various additives to help stabilize the foam in the presence of combustion products, combustion reactants, and various environmental factors. Persons having ordinary skill in the art will further understand that specific surfactants and additives are chosen based on factors including sources of likely fires and the environments in which fires are expected. With respect to Li-ion battery fires, for example, it is advantageous to utilize surfactants and additives that are resistant to the polar solvents that Li-ion batteries typically contain. Specific surfactants and additives used in various embodiments of the present invention can be similarly chosen. Exemplary surfactants include sodium dodecylbenzene sulfonate, magnesium dodecylbenzene sulfonate, sodium lauryl sulfate, magnesium lauryl sulfate, ammonium lauryl ether sulfate, and magnesium lauryl ether sulfate, amongst others. Similarly, concentrations of water, surfactants, and additives can be chosen based on various usage and environmental factors. Exemplary fire-fighting foam compositions (i.e., ratios of the contents of two-component foam cartridge 140) include foams of approximately 50 to approximately 60 weight percent water, approximately 35 weight percent surfactant, and approximately 5 to approximately 15 weight percent additives. Embodiments of the present invention, however, are not to be construed as being limited to the use of only these surfactants and compositions. As-used herein, a "two-component foam" refers to a foam having water as a first component and a "foaming agent" as a second component. In various embodiments the "foaming agent" represents one or more surfactants and any additional additives, but does not exclude the possibly that additional additives are dissolved or suspended in the water component.

Two-component foam cartridge 140 includes aqueous cells 142 and foaming agent cells 144. Two-component foam cartridge 140 can include a different number of aqueous cells 142 and foaming agent cells 144 and can have a different arrangement of cells without departing from the scope of the present invention. Various additives can be dissolved in water contained within aqueous cells 142 and/or mixed with one or more surfactants in foaming agent cells 144. Two-component foam cartridge 140 is made of a material that is substantially impermeable to water (e.g., polyethylene, polypropylene, and various other polymers) and constructed such that aqueous cells 142 and foaming agent cells 144 will rupture, causing water and surfactants and additives contained therein to mix, in response to the detonation of propelling charge 136. It is advantageous that two-component foam cartridge 140 be designed such that as many of aqueous cells 142 and foaming agent cells 144 rupture as possible in response to the expansion of propelling charge 136 upon detonation and/or ignition of propelling charge 136. Persons of ordinary skill in the art will understand that the material used to form two-component foam cartridge 140, cell-wall dimensions, and the pressure generated by propelling charge 136 will affect how two-component foam cartridge 140 ruptures and how pressure is built within and released from chamber 132. In some embodiments, two-component foam cartridge 140 is a unicellular or multicellular cartridge in which water, surfactant(s), and any additives(s) are premixed with each cell.

In various embodiments, two-component foam cartridge 140 is attached to the interior of chamber 132 by one or more mechanical fasteners, one or more chemical fasteners, one or more electromagnetic fasteners, frictional forces, or any combination of the aforementioned elements such that detonation and/or ignition of propelling charge 136 generates sufficient pressure to rupture two-component foam cartridge 140 and eject the fire-fighting foam, at least in part, from chamber 132. In the embodiment depicted in FIG. 1B, the interior of chamber 132 and a bottom surface of two-component foam cartridge 140 define a cavity containing propelling charge 136. Embodiments of the present invention, however, are not limited to this arrangement of two-component foam cartridge 140 and propelling charge 136 within chamber 132 and other arrangements are possible, as will be understood by persons having ordinary skill in the art.

In the embodiment depicted in FIG. 1B, aspirating nozzle 134 is in communication with the interior of chamber 132 such that the two-component fire-fighting foam contained within two-component foam cartridge 140 is expelled from chamber 132 and directed toward a heat/fire source (e.g., battery heat source 105) by aspirating nozzle 134. Aspirating nozzle 134 incorporates a plurality of apertures (i.e., apertures 135) that serve, at least in part, to draw in air (i.e., aspirate) as the two-component fire-fighting foam is ejected through aspirating nozzle 134. Incorporating air via apertures 135 induces turbulence that advantageous increases mixing of water, surfactant(s), and any additives(s) contained within two-component foam cartridge 140 and advantageously increases the expansion ratio of the two-component fire-fighting foam, thereby allowing the foam to suppress fires within a greater area and/or provide better knockdown of flames and/or provide a better seal to atmospheric oxygen.

Figure 2:
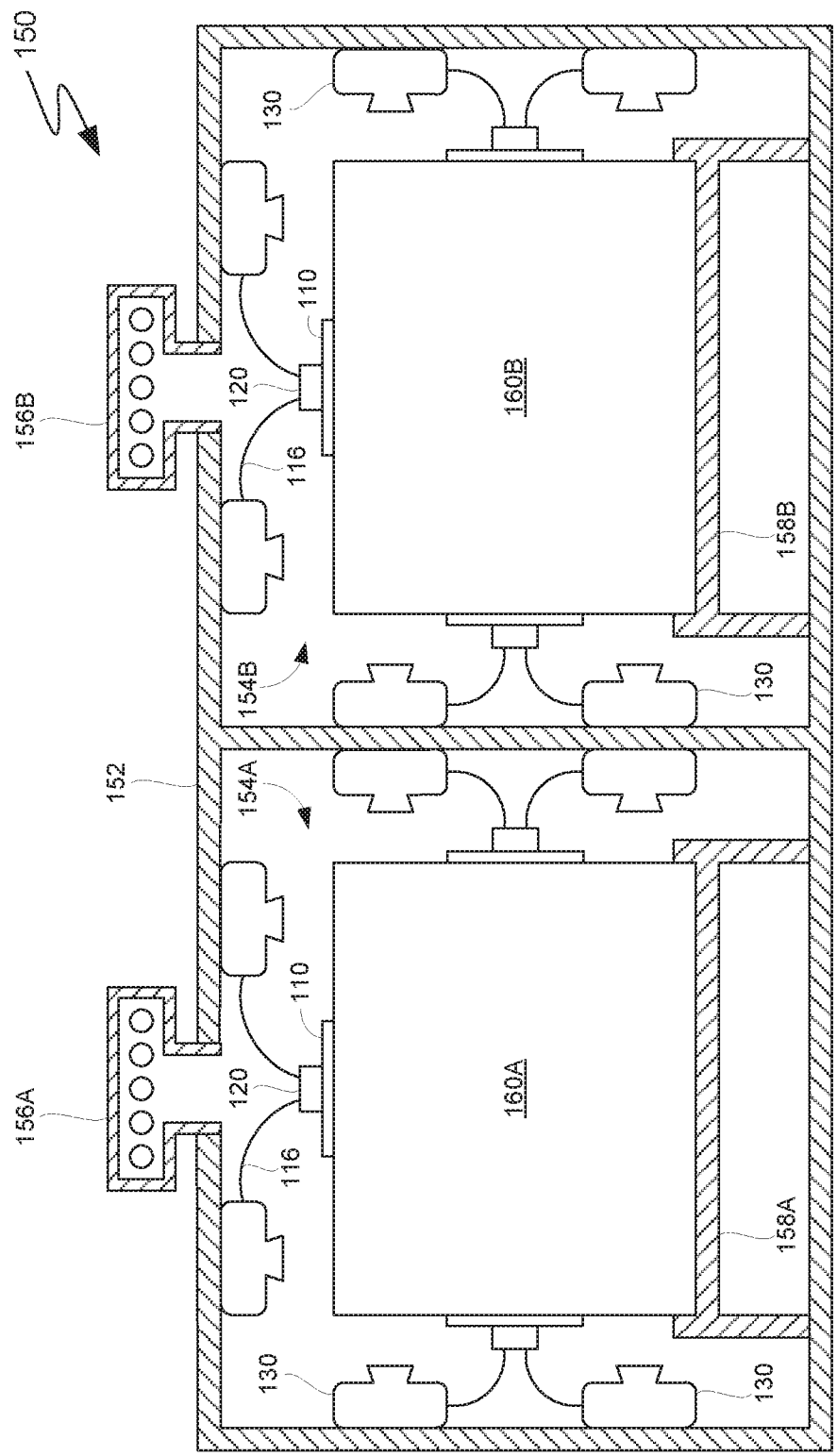
FIG. 2 is a cross-sectional schematic diagram of a Li-ion battery shipping container that is equipped with a plurality of instances of the explosive foam applicator depicted in FIG. 1B, in accordance with an embodiment of the present inventions.

FIG. 2 is a cross-sectional schematic diagram of a Li-ion battery shipping container that is equipped with a plurality of instances of the explosive foam applicator depicted in FIG. 1B, in accordance with an embodiment of the present invention. More specifically, FIG. 2 depicts an embodiment of shipping container 150 that is equipped with a plurality of thermoelectric generators 110, detonator circuits 120, and explosive foam applicators 130. Shipping container 150 and the elements within shipping container 150 are drawn so as to facilitate explanation of various aspects of embodiments of the present invention and are not necessarily drawn to scale. Persons having ordinary skill in the art will understand that the number, size, and arrangements of explosive foam applicators 130, for example, will vary in accordance with the number of batteries that shipping container 150 is designed to transport, a specified degree of fire prevention, suppression, and extinguishing capability, and/or a specified amount of generated foam, among other parameters.

Shipping container 150 is an example of a shipping container for transporting bulk shipments of Li-ion batteries (e.g., tens, hundreds, or thousands of batteries) between two geographical points. In some embodiments, shipping container 150 represents a shipping container that is sized and constructed to meet one or more standards for shipping containers that are transported via cargo aircraft (e.g., such that shipping container 150 complies with requirements for carriage in the cargo hold of a passenger or cargo aircraft). In other embodiments, shipping container 150 represents a shipping container that is sized and constructed to meet one or more standards for shipping containers that are transported via ship, train, and/or truck (e.g., a standardized intermodal shipping container of "ISO" container). In yet other embodiments, shipping container 150 is a purpose-built shipping container designed to transport a specified number of batteries via one or more forms of transportation. In the embodiment depicted in FIG. 2, shipping container 150 includes housing 152 that subdivides shipping container 150 into first compartment 154A and second compartment 154B. Subdividing shipping container 150 in this way is advantageous in order to contain, as much as is practicable, fire and heat generated by failing batteries to a portion of shipping container 150 to limit any resulting losses.

In general, housing 152 is constructed so as to be resistant to heat generated by failing Li-ion batteries, which can generate temperatures that reach approximately 500 degrees Celsius. In some embodiments, housing 152 is constructed from a high-temperature metal alloy (e.g., various high-temperature steel alloys). Embodiments of the present inventions, however, recognize that high-temperature metal alloys can be expensive in monetary terms and unsuitable for weigh-sensitive applications (e.g., air transportation) due to their mass, but that light alloys and various polymer materials, while being light, generally weaken and/or melt at insufficiently high temperatures (e.g., various aluminum alloys have respective melting temperatures between approximately 460 degrees Celsius and approximately 670 degrees Celsius). Therefore, various embodiments utilize ceramic thermal barrier coatings, ablative coatings, thermally insulating coatings, and other temperature resistant materials known in the art to form, in combination with one or more structural materials, a composite structure that provides suitable strength, weight, and heat/flame resistance for various applications of shipping container 150. Additionally, it is advantageous that the one or more materials that form housing 152 be impact resistant and water-resistant to protect the contents of shipping container 150 during transport and surrounding materials and/or structures from water/foam if explosive foam applicators 130 are detonated.

First compartment 154A and second compartment 154B respectively contain first battery pallet 160A and second battery pallet 160B. First compartment 154A also contains first support structure 158A that supports first battery pallet 160A, and similarly, second compartment 154B also contains second support structure 158B that supports second battery pallet 160B. Embodiments of the present invention are not limited to the number and arrangement of compartments depicted in FIG. 2. First battery pallet 160A and second battery pallet 160B each represent a plurality of Li-ion batteries. To load and unload first and second battery pallets 160A and 160B into and out of shipping container 150, first compartment 154A and second compartment 154B can be accessed via one or more moveable panels, doors, hatches, and/or various other forms of moveable barriers known in the art (not shown). In general, first and second support structures 158A and 158B respectively secure first and second battery pallets 160A and 160B within first and second compartments 154A and 154B during transport of shipping container 150. In some embodiments, support structures 158A and 158B include sliding and/or rolling elements to aid in loading and unloading first and second battery pallets 160A and 160B into and out of first and second compartments 154A and 154B. In other embodiments, support structures 158A and 158B represent elements that are integrated with housing 152. Support structures 158A and 158B and be fixedly or removably attached to housing 152 by any form of mechanical, chemical, and/or electromagnetic fastener(s) known in the art. Similarly, first and second battery pallets 160A and 160B can be removably attached to support structures 158A and 158B, respectively, by any form of mechanical, chemical, and/or electromagnetic fastener(s) known in the art. Persons of ordinary skill in the art will understand that support structures 158A and 158B can take various forms within, or be omitted from, shipping container 150 and that embodiments of the present inventions are not limited to structures of the type depicted in FIG. 2.

In the embodiment depicted in FIG. 2, thermoelectric generators 110 are attached to faces of first and second battery pallets 160A and 160B and detonator circuits 120 are attached to thermoelectric generators 110. Leads 116 electrically connect detonator circuits 120 to explosive foam applicators 130. In some embodiments, however, detonator circuits 120 communicates with trigger mechanism 137 via a radio signal and/or any wireless protocol known in the art, and therefore, leads 116 are omitted; detonator circuit 120 and trigger mechanism 137 can incorporate transmitters and/or receivers to facilitate wireless communication. Explosive foam applicators 130 are secured to interior surfaces of first and second compartments 154A and 154B such that an aspirating nozzle of each instance of foam applicator 130 is directed towards a respective face of first battery pallet 160A or second battery pallet 160B. Explosive foam applicators 130 can be fixedly and/or removably secured to housing 152, either directly or utilizing intervening structures, by any form of fastener known in the art. In this particular embodiment, each instance of detonator circuit 120 is electrically connected to trigger mechanisms of two respective explosive foam applicators 130 that are directed towards a face of first or second battery pallet 160A or 160B to which a respective instance of thermoelectric generator 110 is attached. Embodiments of the present invention, however, are not limited to either the number or arrangement of thermoelectric generators 110, detonator circuits 120, and/or explosive foam applicators 130 depicted in FIG. 2. The placement of thermoelectric generators 110 on first and second battery pallets 160A and 160B and the placement of explosive foam applicators 130, for example, can be tailored based on a specific cargo or specific type of cargo.

Placing thermoelectric generators 110 in direct contact with respective surfaces of first and second battery pallets 160A and 160B is advantageous because it facilitates early detection of battery failures. By placing thermoelectric generators 110 in direct contact with first and second battery pallets 160A and 160B, detonator circuits 120 are able to measure the temperature at respective surfaces of first and second battery pallets 160A and 160B directly (i.e., the temperature of hot surface 112 of thermoelectric generators 110), as opposed to indirectly by measuring rising air temperatures as a result of heat produced by failing batteries. Therefore, an instance of detonator circuits 120 can detonate the explosive foam applicator(s) 130 to which it is connected as soon as it registers a threshold temperature at hot surface 112 of a respective instance of thermoelectric generators 110, which is likely to occur earlier in time compared to registering a threshold air temperature because the failing batteries (i.e., battery heat source 105) do not first need to produce sufficient heat to raise the temperature of the ambient air to the threshold air temperature. Additionally, the use of thermoelectric generators 110 and explosive foam applicators 130 is advantageous in that proper functioning of each is not orientation dependent (e.g., gravity dependent), as will be understood by persons having ordinary skill in the art.

As described above, the threshold temperature at which detonator circuits 120 detonate explosive foam applicators 130 can be adjusted. In some embodiments, one or more instances of detonator circuits 120 are configured to detonate respective instances of explosive foam applicators 130 at a first threshold temperature to remove heat from battery pallets 160A and/or 160B before elements therein ignite (e.g., via thermal runaway) while other instances of detonator circuits 120 are configured to detonate respective instances of explosive foam applicators 130 at a second, higher threshold temperature to further combat the effects of battery failures.

Elements of one or more instances of explosively-driven foam application system 100 are omitted from FIG. 2 with respect to the bottom surfaces of first and second compartments 154A and 154B and bottom surfaces of first and second battery pallets 160A and 160B for illustrative simplicity in view the depiction of support structures 158A and 158B. Some embodiments, however, incorporate elements of one or more instances of explosively-driven foam application system 100 with respect to such surfaces in order to coat, at least in part, the bottom surface of first and second battery pallets 160A and 160B in the event of battery failures; support structures 158A and 158B can be modified accordingly (e.g., by incorporating a plurality of perforations). In other embodiments, however, first and second battery pallets 160A and 160B are arranged within first and second compartments 154A and 154B of housing 152 such that bottom surfaces of first and second battery pallets 160A and 160B are submerged or substantially coated by foam that pools at the bottoms of first and second compartments 154A and 154B following the detonation of explosive foam applicators 130.

Shipping container 151 incorporates first vent 156A and second vent 156B. First vent 156A is in communication with first compartment 154A of housing 152 via a corresponding aperture in housing 152. Similarly, second vent 156B is in communication with second compartment 154B of housing 152 via a corresponding aperture in housing 152. Embodiments of the present invention are not limited to the number, type, and arrangement of vents depicted in FIG. 2. While increased pressure and reduced oxygen concentration within first and second compartment 154A and 154B can suppress combustion, too much pressure can compromise the structural integrity of shipping container 151. First and second vents 156A and 156B are advantageous in that they can reduce the buildup of pressure within shipping container 152 in the event of battery failures and any subsequent detonations of explosive foam applicators 130. In some embodiments, one or both of first and second vents 156A and 156B incorporate respective filters and/or scrubbers to mitigate transmission of combustion products (e.g., smoke and fumes) to other areas of a vehicle transporting shipping container 151 (e.g., a passenger compartment). For example, a filter/scrubber can include charcoal filtering elements to filter out particulate matter and/or calcium-contains salts to mitigate transmission of hydrogen fluoride gas. Persons having ordinary skill in the art will understand that filters can incorporate various mechanisms for mitigating transmission of anticipated combustion products. In other embodiments, one or both of first and second vents 156A and 156B represent exhaust pipes that vent combustion products from failing batteries outside of a vehicle transporting shipping container 151 (e.g., to the ambient atmosphere outside of a cargo hold of an aircraft); such exhaust pipes can incorporate filtering/scrubbing elements as described above.

Figure 3A:
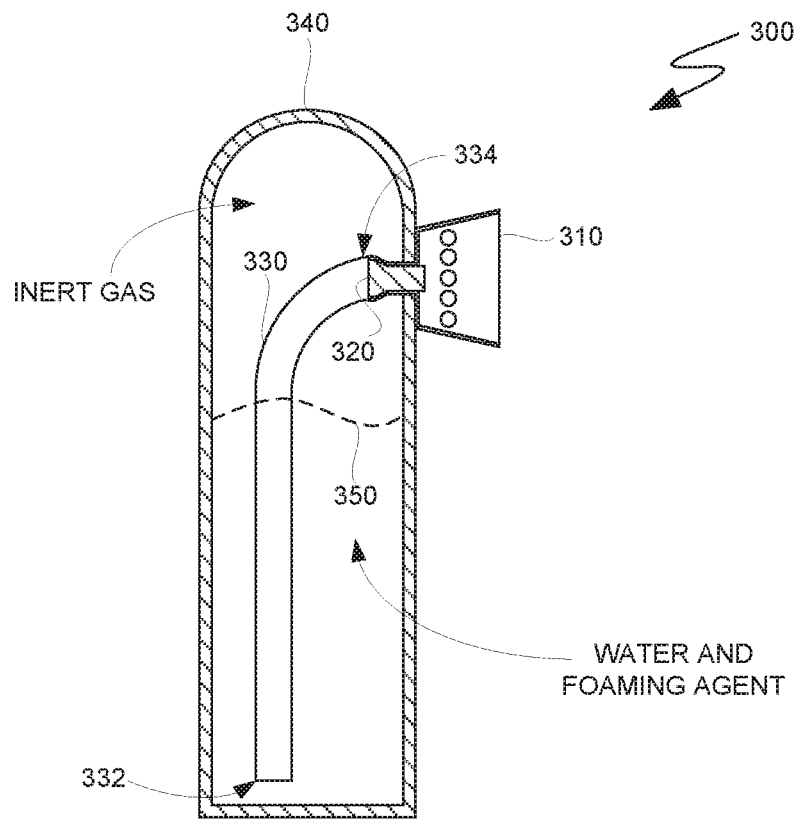
FIG. 3A is a cross-sectional schematic diagram of a pressurized foam applicator, in accordance with an embodiment of the present invention.

FIG. 3A is a cross-sectional schematic diagram of a pressurized foam applicator, in accordance with an embodiment of the present invention. More specifically, FIG. 3A depicts an embodiment of pressurized foam applicator 300, which is configured to generate and apply a fire-fighting foam at a threshold temperature or threshold range of temperatures.

The embodiment of pressurized foam applicator 300 depicted in FIG. 3A includes obturated aspirating nozzle 310, obturator 320, feed tube 330, and pressure vessel 340. Obturator 320 is designed such that obturator 320 obstructs obturated aspirating nozzle 310 to prevent the passage of the contents of pressure vessel 340 through feed tube 330 and obturated aspirating nozzle 310 below a threshold temperature or threshold range of temperatures. At and/or above the threshold temperature or threshold range of temperatures, obturator 320 fails due to one or more effects of temperature on obturator 320 such that the contents of pressure vessel 340 are able to pass through feed tube 330 and out of obturated aspirating nozzle 310, which obturator 320 no longer completely obstructs.

In the embodiment depicted in FIG. 3A, pressure vessel 340 contains a pre-pressurized inert gas and an aqueous mixture of the phases of a two-component fire-fighting foam (e.g., a mixture of water and a foaming agent). The two-component fire-fighting foam and its various components are substantially similar to the two-component fire-fighting foam discussed previously. In various embodiments, the pressurized inert gas can be one of, or a combination of, nitrogen, carbon dioxide, helium, argon, and/or various other inert gases known in the art. In general, pressures within pressure vessel 340 are comparable to pressures within various types of fire extinguishers known in the art. For example, the inert gas can be pressurized to between approximately 690 kilopascals to approximately 5860 kilopascals depending on factors including the type or pressurized gas, the amount of two-component fire-fighting foam contained within pressure vessel 340, a specified flux of foam, and a specified distance to which pressurized foam applicator 300 is to apply the foam, amongst other factors.

In general, the aqueous mixture of the phases of the two-component fire-fighting foam does not form a stable mixture with the pressurized inert gas within pressure vessel 340, and thus surface level 350 represents an interface between the pressurized inert gas and the aqueous mixture. Feed tube 330 is designed and positioned within pressure vessel 340 such that first end 332 of feed tube 330 is positioned below surface level 350 to maximize the amount of the aqueous mixture that can be applied, as a foam, via pressurized foam applicator 300. Second end 334 of feed tube 330 is attached to obturated aspirating nozzle 310 so that the aqueous mixture, under pressure from the pressurized inert gas, can be ejected through obturated aspirating nozzle 310 when obturator 320 no longer obstructs obturated aspirating nozzle 310. Second end 334 of feed tube 330 can be fixedly or removably attached to obturated aspirating nozzle 310, either directly or indirectly, by any method known in the art. Similarly, obturated aspirating nozzle 310 can be fixedly or removable attached to pressure vessel 340, either directly or indirectly, by any method known in the art that is sufficient to contain the contents of pressure vessel 340. Features of obturated aspirating nozzle 310 and obturator 320 are discussed in more detail below with respect to FIG. 3B.

Figure 3B:
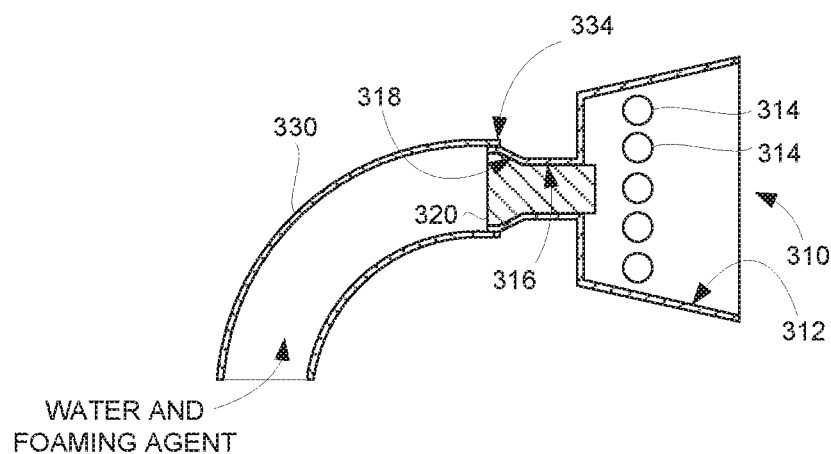
FIG. 3B is a cross-sectional schematic diagram showing a more detailed view of the obturated aspirating nozzle and obturator depicted in FIG. 3A, in accordance with an embodiment of the present invention.

FIG. 3B is a cross-sectional schematic diagram showing a more detailed view of the obturated aspirating nozzle and obturator depicted in FIG. 3A, in accordance with an embodiment of the present invention.

In the embodiment depicted in FIG. 3B, obturated aspirating nozzle 310 includes bell portion 312, throat surface 316 and shoulder surface 318. Bell portion 312 is substantially similar to aspirating nozzle 134, as described with respect to FIG. 1B, and includes apertures 314, which are substantially similar to apertures 135, as described with respect to FIG. 1B. Second end 334 of feed tube 330 is attached to obturated aspirating nozzle 310, as described above with respect to FIG. 3A. Throat surface 316 and shoulder surface 318 of obturated aspirating nozzle 310 (i.e., interior surface of obturated aspirating nozzle 310) are designed to mate with obturator 320, which is similarly shaped. Under the force of the pressurized aqueous mixture of water and foaming agent, obturator 320 is held within obturated aspirating nozzle 310 by throat surface 316 and shoulder surface 318 of obturated aspirating nozzle 310. Shoulder surface 318 of obturated aspirating nozzle 310 resists movement of obturator 320 through obturated aspirating nozzle 310, at least in part, via the application of a normal force to obturator 320. Throat surface 316 of obturated aspirating nozzle 310 resists movement of obturator 320 through obturated aspirating nozzle 310, at least in part, via the application of a frictional force to obturator 320. In other embodiments, obturated aspirating nozzle 310 incorporates additional and/or different types of structural elements, such as detents, catches, ribs, and other structures and/or devices known in the art, to resist the movement of obturator 320. Embodiments of the present invention are not to be construed as being limited to the elements depicted in FIG. 3B. In some embodiments, obturator 320 is oversized relative to throat surface 316 and shoulder surface 318 of obturated aspirating nozzle 310, thereby causing obturated aspirating nozzle 310 to compress obturator 320 when obturator 320 is inserted into obturated aspirating nozzle 310. To resist the compression, obturator 320 exerts normal forces against throat surface 316 and shoulder surface 318 that advantageously increase frictional forces that assists in retaining obturator 320 within obturated aspirating nozzle 310.

In general, the material(s) from which obturator 320 is made affect the pressure that can be held within pressurized foam applicator 300 and the temperature(s) at which pressurized foam applicator 300 applies the two-component fire-fighting foam to failing batteries. In some embodiments, obturator 320 is made of polyvinyl chloride (PVC) materials having various degrees of crystallinity. For example, PVC having a degree of crystallinity of approximately ten to approximately fifteen percent melts at approximately 85 degrees Celsius. Controlling the degree of crystallinity can advantageously provides a degree of control over the melting point and/or glass transition temperature of the PVC material. Decreasing the degree of crystallinity generally lowers melting temperatures while increasing the degree of crystallinity generally increases melting temperature. In other embodiments, obturator 320 is made of various types of nylon. Nylon 6,6 (i.e., poly(hexamethylene adipamide)), for example, melts at approximately 256 degrees Celsius. In yet other embodiments, obturator 320 is made of various low-temperature metallic alloys. For example, various alloys of bismuth, tin, and/or lead exhibit melting temperatures of approximately 47 degrees Celsius to approximately 138 degrees Celsius. In one more specific example, an alloy of 58 weight percent bismuth and 42 weight percent tin melts at approximately 138 degrees Celsius.

Embodiments of the present inventions recognize that, at a sufficiently high temperature, the force applied via the pressurized aqueous mixture of water and foaming agent can cause obturator 320 to rupture. Embodiments of the present invention also recognize, that temperature affects the yield strength and ductility of materials. For example, yield strength generally decreases as temperature increases while ductility increases as temperature increases. Additionally, amorphous and semi-amorphous materials (e.g., polymer materials of varying degrees of crystallinity) generally transition from a hard and relatively brittle state to a viscous or ductile state at their glass transition temperature. As used herein, the classes of non-metallic and metallic materials described above are referred to as "temperature-dependent breakdown material(s)." Use of temperature-dependent breakdown materials is also discussed with respect to subsequent figures.

In the embodiment depicted in FIG. 3B, when obturator 320 reaches a threshold temperature or threshold range of temperatures as a result of heat generated by failing batteries (e.g., battery heat source 105), obturator 320 softens to the point that it is sufficiently ductile for the force applied by the pressurized aqueous mixture of water and foaming agent within pressure vessel 340 to force obturator 320 along shoulder surface 318 of obturated aspirating nozzle 310, thereby squeezing and elongating obturator 320, and along throat surface 316 until obturator 320 is ejected from obturated aspirating nozzle 310 via bell portion 312. This embodiment, and similar embodiments, advantageously cause obturator 320 to fail such that obturated aspirating nozzle 310 becomes completely unobstructed when obturator 320 becomes sufficiently ductile for it to be forced from obturated aspirating nozzle 310. In other embodiments, obturator 320 is designed to fail by melting and/or softening to the point that the force applied by the pressurized aqueous mixture of water and foaming agent within pressure vessel 340 is sufficient to rupture obturator 320 in one or more locations. The force of the aqueous mixture of water and foaming agent flowing through the now at least partially unobstructed obturated aspirating nozzle 310 may expand ruptured portions of obturator 320 and thereby increase the flux of the two-component fire-fighting foam.

In some embodiments, obturator 320 represents a valve that restricts passage of the aqueous mixture of water and foaming agent when in a closed position (e.g., a valve within feed tube 330 or obturated aspirating nozzle 310). The valve embodiment of obturator 320 is controlled by a mechanical actuator that is biased (e.g., via spring pressure) to maintain the valve in an open position, wherein one or more structures made of temperature-dependent breakdown material(s) apply a normal force to the valve and/or mechanical actuator that causes the valve to remain in a closed position against the biasing force. At a sufficiently high threshold temperature or threshold range of temperatures, the one or more structures made of temperature-dependent breakdown material(s) melt or yield such that the mechanical actuator moves the valve into the open position and maintains the valve in the open position under the biasing force. Valve embodiments of obturator 320 can include one or more pivoting levers to magnify and/or transmit the biasing force of the mechanical actuator and/or normal force of the temperature-dependent breakdown material structure(s) to the valve.

Figure 4:
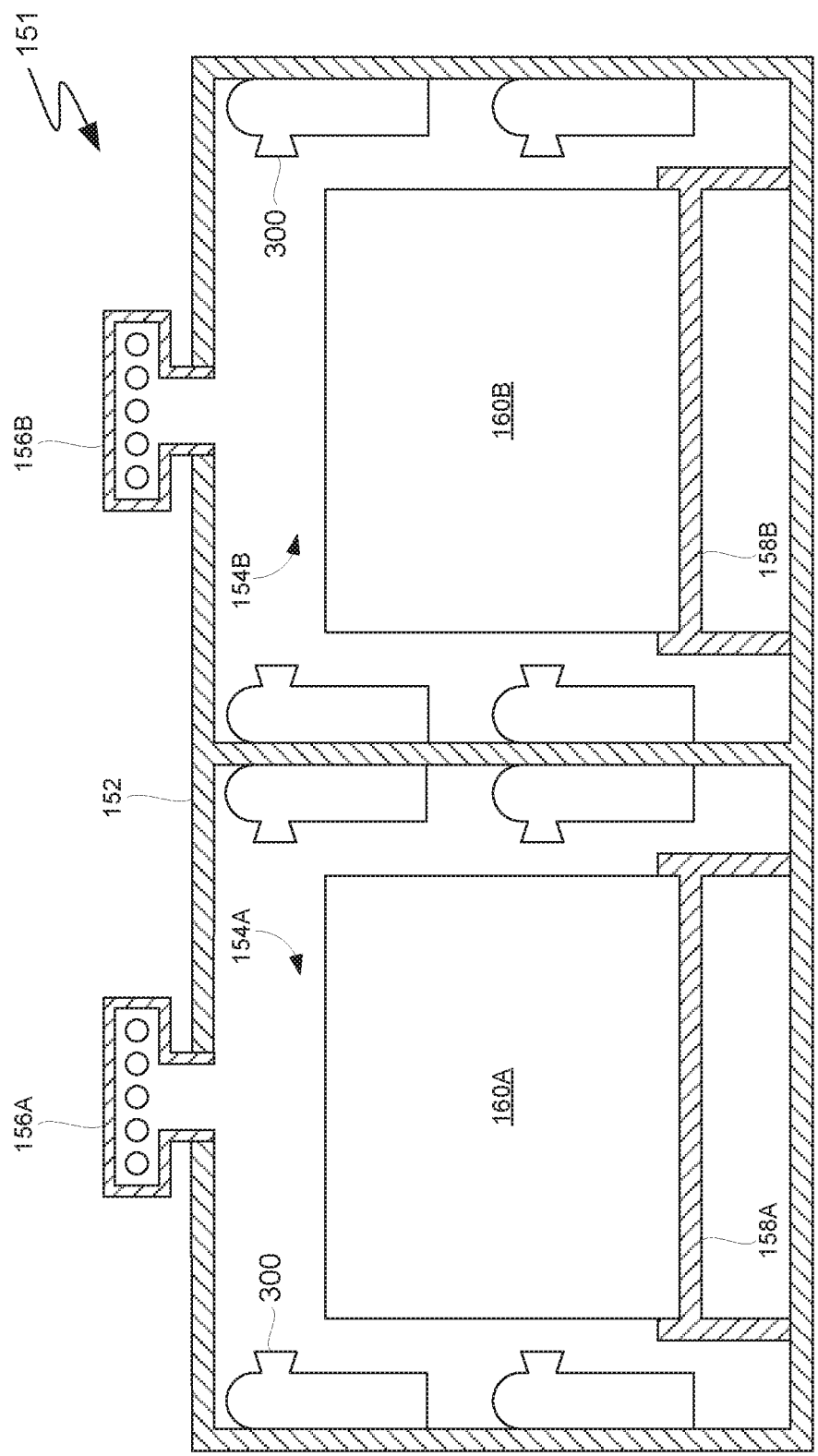
FIG. 4 is a cross-sectional schematic diagram of a Li-ion battery shipping container that is equipped with a plurality of instances of the pressurized foam applicator depicted in FIG. 3A, in accordance with an embodiment of the present inventions.

FIG. 4 is a cross-sectional schematic diagram of a Li-ion battery shipping container that is equipped with a plurality of instances of the pressurized foam applicator depicted in FIG. 3A, in accordance with an embodiment of the present inventions.

More specifically, FIG. 4 depicts shipping container 151. Shipping container 151 is substantially similar to shipping container 150, as described with respect to FIG. 2. Shipping container 151, however, omits thermoelectric generators 110, detonator circuits 120, leads 116, and explosive foam applicators 130. In place of some of explosive foam applicators 130, shipping container 151 includes pressurized foam applicators 300, as described with respect to FIGS. 3A and 3B. Pressurized foam applicators 300 are arranged within first and second compartments 154A and 154B of housing 152 to substantially coat the surfaces of first and second battery pallets 160A and 160B with the two-component fire-fighting foam when air temperatures within first compartment 154A and/or second compartment 154B reach the threshold temperature or threshold range of temperatures at which obturator 320 of pressurized foam applicators 300 are designed to fail, as discussed with respect to FIG. 3B. Compared to shipping container 150, shipping container 151 advantageously includes a fewer number of elements as a result of omitting thermoelectric generators 110, detonator circuits 120, and leads 116.

While shipping container 151 includes fewer elements, in general, pressurized foam applicators 300 depend more on the orientation of shipping container 151 to function correctly than explosive foam applicators 130 depend on the orientation of shipping container 150 to function correctly. This difference can be due to the fact that first end 332 of feed tube 330 must be below surface level 350 for a respective instance of pressurized foam applicators 300 to function correctly; the orientation of surface level 350 depends on the orientation of the instance of the pressurized foam applicators 300 with relation to the direction of net gravitational force. This difference can also arise between embodiments of explosive foam applicator 130 that achieve higher operating pressures than embodiments of pressurized foam applicator 300 due to the use of explosives. In the embodiment depicted in FIG. 4, for example, this difference is manifested by that the fact that pressurized foam applicators 300 are similarly oriented with respect to the bottom surface of shipping container 151 and none are attached to the top surfaces of first and second compartments 154A and 154B. Instead, pressurized foam applicators 300 are attached to the side surfaces of first and second compartments 154A and 154B such that they can spray the two-component fire-fighting foam onto the top surfaces of first and second battery pallets 160A and 160B. In some embodiments, pressurized foam applicators are rotatably attached to surfaces of first and second compartments 154A and 154B (e.g., via ball joints) to compensate for motion of shipping container 151.

To function in a greater range of orientations, however, pressurized foam applicators 300 can be rotatably attached to surfaces of first and second compartments 154A and 154B such that pressurized foam applicators 300 maintain an orientation that enables pressurized foam applicators 300 to function correcting. For example, pressurized foam applicators 300 can be mounted on ball joints, or another form or rotatable joint, that enable the force of gravity to maintain pressurized foam applicators 300 within an acceptable range of orientations within shipping container 151. In some embodiments, one or more springs or electric motors can supplement and/or overcome the force of gravity to maintain pressurized foam applicators 300 within an acceptable range of orientations. Additionally, pressurized foam applicators 300 can function in a greater range of orientations by supplying a propelling force to the aqueous mixture by a means other than a pressurized inert gas at an interface with the aqueous mixture. For example, embodiments of pressurized foam applicators 300 can utilize a movable diaphragm within pressure vessel 340 that moves within pressure vessel 340 under a biasing force supplied by a pressurized inert gas (i.e., one that is separated from the aqueous mixture by the diaphragm), a spring, an elastomeric material, a hydraulic actuator, and/or a mechanical actuator to eject the aqueous mixture from obturated aspirating nozzle 310 following the failure of obturator 320. The biasing force supplied to the diaphragm can be calibrated to be less than a force that will cause obturator 320 to fail below the threshold temperature or range of temperatures. Feed tube 330 can be shortened, omitted, or otherwise modified to facilitate travel of the diaphragm within pressure vessel 340.

While the embodiments of the present invention discussed thus far contemplate, and are optimized for, containing and suppressing the effects of multiple failing Li-ion batteries (e.g., tens, hundreds, or thousands of batteries), other embodiments of the present invention contemplate, and are optimized for, containing and suppressing the effects of individual failing Li-ion batteries and/or individual electronic devices containing Li-ion batteries. Embodiments of the invention discussed subsequently, however, are not necessarily limited to incorporating a single battery or single electronic device.

Figure 5A:
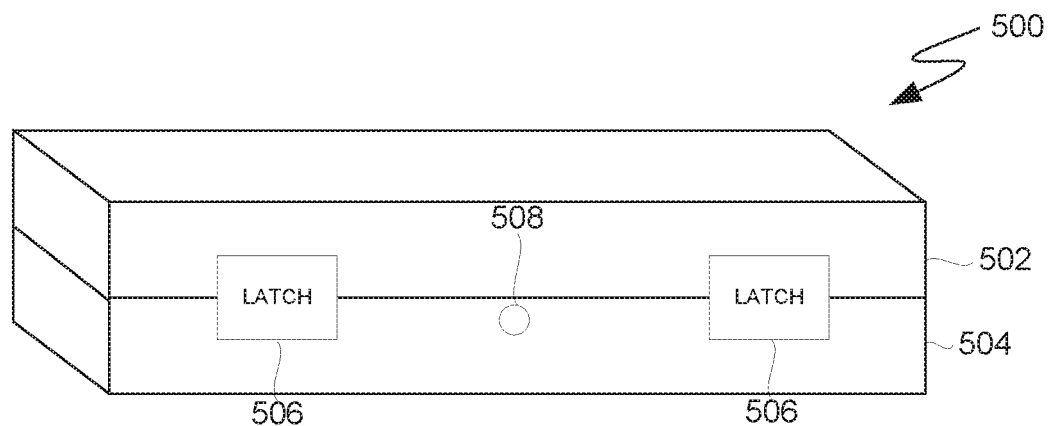
FIG. 5A is a perspective view of a schematic diagram of a Li-ion battery travel case, in accordance with an embodiment of the present disclosure.

FIG. 5A depicts a perspective view of a schematic diagram of a Li-ion battery travel case, in accordance with an embodiment of the present disclosure. More specifically, FIG. 5A depicts travel case 500 including top compartment 502 and bottom compartment 504.

In the embodiment depicted in FIG. 5A, top compartment 502 and bottom compartment 504 are selectively joined to one another via latches 506. As discussed in greater detail with respect to subsequent figures, separating top compartment 502 from bottom compartment 504 allows for the insertion and/or removal of a battery or electronic device from bottom compartment 504. Top compartment 502 and bottom compartment 504 can be joined by any form of joint and/or attachment known in the art. In some embodiments, for example, a hinge rotatably joins top compartment 502 to bottom compartment 504 along a common edge and one or more latches secure top compartment 502 to bottom compartment 504 in the closed position.

In general, travel case 500, and bottom compartment 504 in particular, is sized to accommodate individual consumer electronic devices containing Li-ion batteries (e.g., smartphones, tablets, etc.) and/or individual removable Li-ion batteries from consumer electronic devices (e.g., batteries from laptops, power tools, etc.). Due to varying sizes of consumer electronic devices and batteries therein, in some embodiments, bottom compartment 504 can accommodate multiple small batteries and/or electronic devices if sized to accommodate a single, larger battery or electronic device. Embodiments of the present invention, however, are not necessarily limited to any particular size or number of batteries and/or electronic devices.

In the event that a battery contained within travel case 500 fails, travel case 500 is designed to contain and suppress the effects of the failure. To contain such failures, at least top compartment 502 and bottom compartment 504 of travel case 500 are constructed of materials that are capable of withstanding heat generated by such failures. As noted above, Li-ion battery failures can produce temperatures of approximately 500 degrees Celsius. In some embodiments, materials used to construct top compartment 502 and bottom compartment 504 are analogous to those used to construct housing 152 of shipping containers 150 and 151 discussed with respect to FIGS. 2 and 4 respectively. Some embodiments of travel case 500, however, are small enough that they may be handled by individuals. For example, crew of an aircraft transporting a Li-ion battery in travel case 500 may wish to inspect travel case 500 in the event of a battery failure. In at least some embodiments, it is therefore advantageous to construct travel case 500 such that individuals can handle travel case 500 via its external surfaces in the event of a battery failure. In one example of such embodiments, top compartment 502 and bottom compartment 504 are constructed of a composite material represented by three "layers" of material. A first layer of material represents respective interior surfaces of top compartment 502 and bottom compartment 504 and is impermeable to water and is heat and flame resistant under conditions generally produced by Li-ion battery fires (e.g., a high-temperature metal alloy). A second, "core" layer is a thermally insulating layer (e.g., a porous heat-resistant material and/or a heat-resistant material having low thermal conductivity). A third layer represents a respective exterior surface of top compartment 502 and bottom compartment 504 and is abrasion and impact resistance (e.g., a hard polymer material). In the event of a failure, the first layer preserves the structural integrity of travel case 500 and the second, "core" layer reduces the amount of heat that is transmitted to the third layer representing the exterior of travel case 500. The third layer resists punctures and abrasion of travel case 500.

In general, top compartment 502, bottom compartment 504, and any fixtures that attach top compartment 502 to bottom compartment 504 (e.g., latches 506) are constructed so as to resist increased pressures within travel case 500 as a result of combustion products during a battery failure. In the embodiment depicted in FIG. 5A, pressure relief valve 508 is integrated with bottom compartment 504. Pressure relief valve 508 represents various types of one-way valves known in the art (e.g., a springe-tensioned duckbill valve, umbrella valve, etc.). Pressure relief valve 508 releases gas from bottom compartment 504 when pressure within travel case 500 reaches a threshold pressure to which the pressure relief valve 508 is calibrated. Pressure relief valve 508 can also incorporate filtering and scrubbing elements as discussed with respect to vents 155E and 155F of FIG. 2.

Figure 5B:
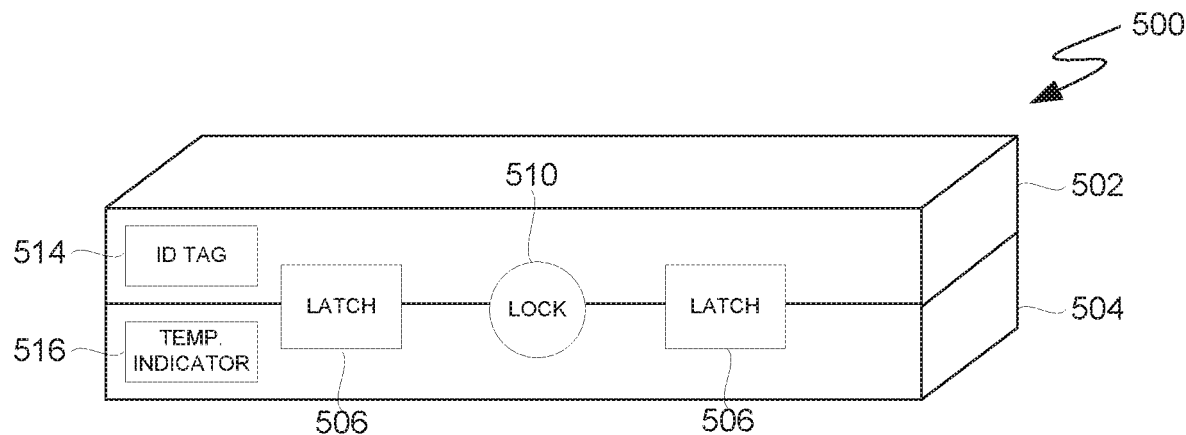
FIG. 5B is an opposing perspective view of the schematic diagram of the Li-ion battery travel case depicted in FIG. 5A, in accordance with an embodiment of the present disclosure.

FIG. 5B depicts an opposing perspective view of the schematic diagram of the Li-ion battery travel case depicted in FIG. 5A, in accordance with an embodiment of the present disclosure. More specifically, FIG. 5B depicts an opposing perspective view of travel case 500.

In the embodiment depicted in FIG. 5B, travel case 500 includes additional instances of latches 506 on an opposing, longitudinal side of travel case 500 with respect to the longitudinal side of travel case 500 depicted in FIG. 5A. In addition to latches 506, FIG. 5B depicts a lock that secures top compartment 502 to bottom compartment 504 and prevents unauthorized individuals from inserting and/or removing batteries and/or electronic devices from travel case 500. Embodiments of travel case 500 can utilize a key lock, a combination lock, or any form of lock known in the art.

Various embodiments of travel case 500 also include identification (ID) tag 514, as depicted in FIG. 5B. In some embodiments, ID tag 514 represents a radio frequency identification (RFID) tag. In other embodiments, ID tag 514 represents a bar code or quick response (QR) code. ID tag 514 can also represent other forms of identification known in the art. In some embodiments, ID tag 514 identifies travel case 500 such that travel case 500 can be tracked as it moves through a transportation and/or cargo-handling network as ID tag 514 is scanned at various nodes in the transportation and/or cargo-handling network. In other embodiments, ID tag 514 is also associated with the contents of travel case 500 such that the contents of travel case 500 can be similarly tracked. In some embodiments, ID tag 514 is removably attached to travel case 500 (e.g., via an adhesive) so that new a new ID tag can be attached to travel case 500 (e.g., when the contents of travel case 500 change). In other embodiments, ID tag 514 represents an electronic device than can be reprogrammed in response to changes to travel case 500 and/or the contents of travel case 500.

In order to alert individuals to the status of the contents of travel case 500 (e.g., whether or not a failure of the contents of travel case 500 has occurred), travel case 500 includes temperature indicator 516 in the embodiment depicted in FIG. 5B. In some embodiments, temperature indicator 516 represent an element incorporating thermochromic paint pigments that change color in response to changes in temperature. To enhance the accuracy of temperature indicator 516, temperature indicator 516 can be attached to the interior to travel case 500 by one or more thermally conductive members. In other embodiments, temperature indicator 516 represents, at least in part, a digital display, microcontroller, and power supply that enable temperature indicator 516 to measure and display temperatures within travel case 500 using a temperature sensor therein (e.g., using a thermocouple). In general, travel case 500 can utilize any type of temperature sensor and/or display technology known in the art to indicate the temperature within travel case 500 and/or that a battery failure has occurred within travel case 500.

Figure 5C:
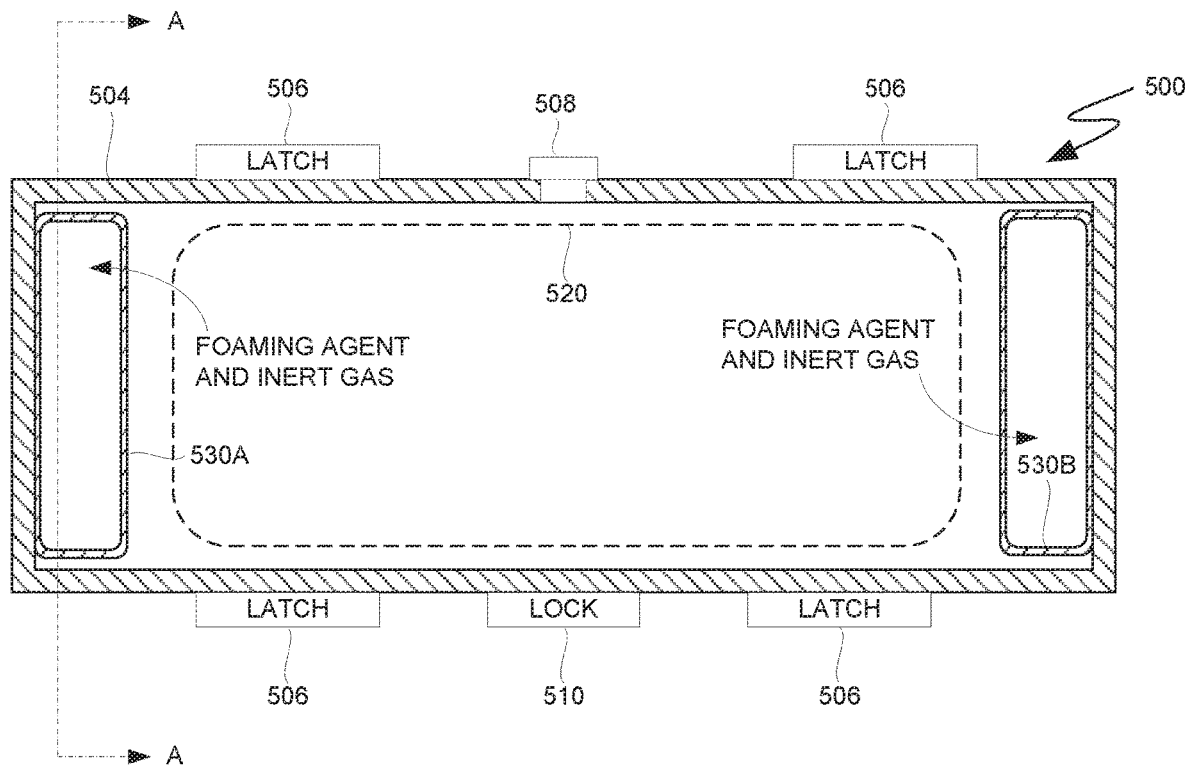
FIG. 5C is a perspective view of the schematic diagram of the Li-ion battery travel case depicted in FIG. 5A showing a top-down view of the bottom compartment of the Li-ion battery travel case, in accordance with an embodiment of the present invention.

FIG. 5C is a perspective view of the schematic diagram of the Li-ion battery travel case depicted in FIG. 5A showing a top-down view of the bottom compartment of the Li-ion battery travel case, in accordance with an embodiment of the present invention. More specifically, FIG. 5C is a schematic diagram depicting a top-down view of bottom compartment 504, with respect to an embodiment of travel case 500.

In the embodiment depicted in FIG. 5C, battery 520 is depicted, in outline form, between first foaming agent cartridge 530A and second foaming agent cartridge 530B. As stated previously, battery 520 can represent one or more batteries and/or one or more battery-containing electronic devices that can be inserted into and removed from travel case 500. First foaming agent cartridge 530A is attached to bottom compartment 504 at a first end of bottom compartment 504 and second foaming agent cartridge 530B is attached to a second, opposite end of bottom compartment 504 with respect to second foaming agent cartridge 530B. First and second foaming agent cartridges 530A and 530B can be fixedly or removably attached to bottom compartment 504 using mechanical fastener(s), chemical fastener(s), electromagnetic fastener(s), and/or another type of fastener known in the art. Embodiments of the present invention are not to be construed as being limited to either the number or arrangement of foaming agent cartridges depicted in FIGS. 5C and 5D.

First and second foaming agent cartridges 530A and 530B are made of a temperature-dependent breakdown material.

As previously discussed with respect to FIGS. 3A and 3B, the temperature-dependent breakdown material can be one of various metallic and non-metallic materials that melt, soften, and/or yield at temperatures that result from battery failures. First and second foaming agent cartridges 530A and 530B contain a foaming agent. Under normal conditions within travel case 500 (i.e., "ambient" conditions), first and second foaming agent cartridges 530A and 530B prevent the release of the foaming agent. Failure of battery 520, however, will cause temperatures within travel case 500 to increase. At a threshold temperature or threshold range of temperatures, first and second foaming agent cartridges 530A and 530B melt or otherwise fail to enable the release of the foaming agent and facilitate fire-fighting foam production within travel case 500 to moderate thermal runaway of battery 520 or suppress or extinguish a fire resulting from the failure of battery 520. In some embodiments, like the embodiment depicted in FIGS. 5C and 5D, first and second foaming agent cartridges 530A and 530B also contain a pressurized inert gas. The inert gas can be one of, or a combination of, nitrogen, carbon dioxide, helium, argon, and other inert gasses known in the art. Including a pressurized inert gas, or gases, within first and second foaming agent cartridges 530A and 530B is advantageous in that the pressure exerted by the gas can cause first and second foaming agent cartridges 530A and 530B to rupture outwardly when the temperature-dependent breakdown material forming first and second foaming agent cartridges 530A weakens to the point that it fails via a brittle and/or ductile failure mechanism (i.e., by fracturing and/or tearing) at the threshold temperature or threshold range of temperatures. Persons of ordinary skill in the art will understand that the threshold temperature or threshold range of temperatures can be adjusted by varying the specific type of temperature-dependent breakdown material, the dimensions of first and second foaming agent cartridges 530A and 530B (e.g., wall thickness and/or cartridge shape), and the pressure of the inert gas or gases, among other factors. Additionally, in exiting first and second foaming agent cartridges 530A and 530B, the inert gas can advantageously aid in dispersing the foaming agent throughout the interior of travel case 500. Pressure relief valve 508 can advantageously moderate pressure within travel case 500 such that the release of the inert gas from first and second foaming agent cartridges 530A and 530B does not cause the pressure within travel case 500 to exceed the mechanical limits of latches 506 and/or lock 510.

Figure 5D:
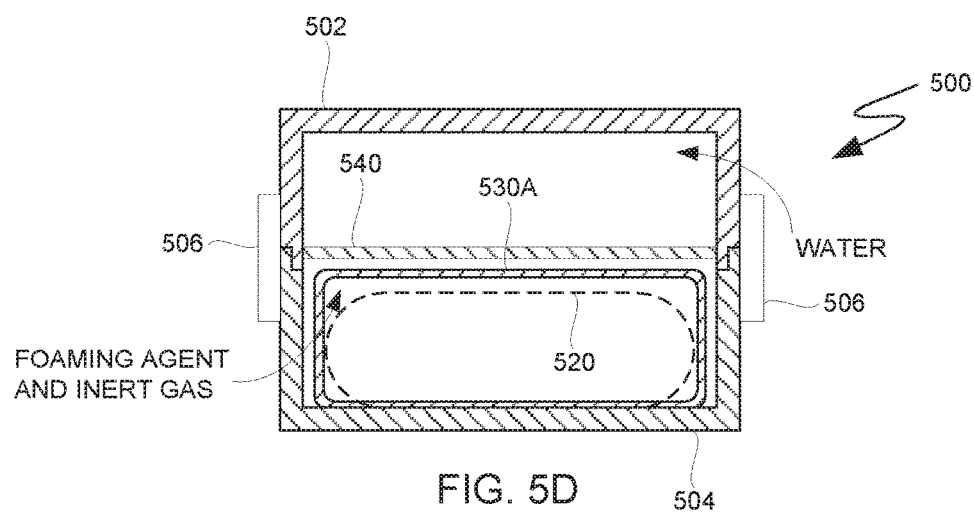
FIG. 5D is a cross-sectional view of the schematic diagram of the Li-ion battery travel case depicted in FIG. 5A along line A-A, as depicted in FIG. 5C, in accordance with an embodiment of the present invention.

FIG. 5D is a cross-sectional view of the schematic diagram of the Li-ion battery travel case depicted in FIG. 5A along line A-A, as depicted in FIG. 5C, in accordance with an embodiment of the present invention. More specifically, FIG. 5D is a cross-sectional schematic diagram, including top compartment 502 and bottom compartment 504, of travel case 500 along line A-A, as depicted in FIG. 5C.

FIG. 5D depicts the first end of bottom compartment 504 including first foaming agent cartridge 530A, as discussed with respect to FIG. 5C. FIG. 5D also depicts an outline of battery 520 within bottom compartment 504. In the embodiment depicted in FIG. 5D, latches 506 secure top compartment 502 to bottom compartment 504, and top compartment 502 includes separator 540. Separator 540 represents a water-impermeable, temperature-dependent breakdown material that seals top compartment 502 to form a sealed compartment within a volume defined, at least in part, by the interior surfaces of top compartment 502. In the embodiment depicted in FIG. 5D, separator 540 forms a single sealed compartment within top compartment 502. In other embodiments, top compartment 502 includes one or more transverse dividing members and/or one or more longitudinal dividing member to form, in conjunction with separator 540, a plurality of sealed subcompartments. Separator 540 is impermeable to water so as to enable top compartment 502 to store a quantity of water. It is advantageous that separator 540 be made of a material of sufficient hardness and/or toughness to resist punctures and abrasions that are likely to occur during normal usage of travel case 500. In some embodiments, separator 540 is made of a composite material having the properties described herein with respect to separator 540.

As discussed with respect to FIG. 5C, failure of battery 520 will cause temperatures to increase within travel case 500. Similar to first and second foaming agent cartridges 530A and 530B, separator 540 is made of a temperature-dependent breakdown material designed to melt or otherwise fail at a threshold temperature or threshold range of temperatures. Failure of separator 540 results in water flowing from top compartment 502 to bottom compartment 504 under the force of gravity and/or inertial force(s). In some embodiments, separator 540 and first and second foaming agent cartridges 530A and 530B are designed to fail at the same threshold temperature or threshold range of temperatures. In other embodiments, separator 540 and first and second foaming agent cartridges 530A and 530B are designed to fail progressively. For example, separator 540 can be designed to fail at a lower threshold temperature or threshold range of temperatures than first and second foaming agent cartridges 530A and 530B, and consequently, the foaming agent and inert gas within first and second foaming agent cartridges 530A and 530B will be released into water within bottom compartment 504. Releasing the foaming agent into water under pressure of the inert gas is advantageous in that it will encourage mixing (i.e., agitation) of the water and foaming agent to create a two-component fire-fighting foam to coat battery 520. Additionally, the inert gas can advantageously increase the expansion ratio of the foam by aerating the foam. In some embodiments the foaming agent includes additive(s) that generate additional gas via a chemical reaction with water and/or solute(s) dissolved in the water (e.g., reactions between various carbonates and various acids, which produce carbon dioxide); it is advantageous that the generated gas be an inert gas as opposed to oxygen and/or a flammable gas. Combustion products produced by failure of battery 520 can also aerate the foam and encourage mixing of the foaming agent and water.

In general, top compartment 502 is sized to contain an amount of water that is sufficient to generate a foam that substantially coats the contents of travel case 500. In some embodiments, the amount of foam can fill or substantially fill the interior of travel case 500. In other embodiments, the amount of foam fills or substantially fills only bottom compartment 504. In general, the volume of battery 520 (i.e., the contents of travel case 500) can significantly affect the degree to which the foam fills the interior of travel case 500; it is advantageous to provide sufficient water and foaming agent to generate an amount of foam that is sufficient to substantially coat battery 520 and thereby moderate thermal runaway of battery 520 and/or suppress or extinguish a fire resulting from a failure of battery 520. Pressure relief valve 508 can be designed to function in the presence of water and/or foam so as to advantageously moderate pressure within travel case 500 following failure of separator 540.

Figure 5E:
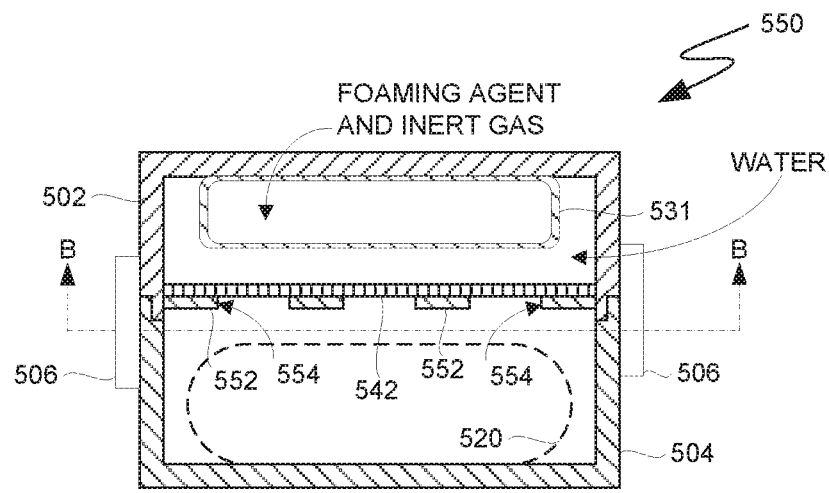
FIG. 5E is a cross-sectional schematic diagram on an embodiment of the Li-ion battery travel case depicted in FIGS. 5A and 5B, in accordance with an embodiment of the present invention.

FIG. 5E is a cross-sectional schematic diagram on an embodiment of the Li-ion battery travel case depicted in FIGS. 5A and 5B, in accordance with an embodiment of the present invention. More specifically, FIG. 5E depicts an embodiment of travel case 500, designated travel case 550, having exterior features that are substantially similar to those of travel case 500. In the embodiment depicted in FIG. 5E, for example, travel case 550 includes top compartment 502, bottom compartment 504, and latches 506 as described with respect to travel case 500 and FIGS. 5A and 5D. Travel case 550 differs from travel case 500 with respect to elements used to generate the two-component fire-fighting foam.

Like the embodiment of travel case 500 depicted in FIG. 5D, latches 506 removably join top compartment 502 of travel case 550 to bottom compartment 504 of travel case 550 in the embodiment depicted in FIG. 5E. Battery 520 is shown, in outline form, within bottom compartment 504 and can be inserted and removed from travel case 550. Unlike the embodiment of travel case 500 described with respect to FIGS. 5C and 5D, bottom compartment 504 of travel case 550 does not contain foaming agent cartridges. Instead, top compartment 502 of travel case 550 includes foaming agent cartridges 531. Foaming agent cartridges 531 are substantially similar to first and second foaming agent cartridges 530A and 530B in terms of their design, construction, and function. In the embodiment depicted in FIG. 5E, for example, foaming agent cartridges 531 contain a foaming and an inert gas. Foaming agent cartridges 531, however, are (i) smaller and more numerous than first and second foaming agent cartridges 530A and 530B (see FIG. 5F) and (ii) are co-located in top compartment 502 along with water stored within top compartment 502 of travel case 550 instead of in bottom compartment 504. Embodiments of the present invention, however, are not to be construed as being limited to the number, arrangement, and/or size of foaming agent cartridges 531 depicted in FIGS. 5E-5G.

Water is retained within top compartment 502 by membrane 542 and scaffold 552. Scaffold 552 include apertures 554 that enable water, foam, and foaming agents to flow between top compartment 502 and bottom compartment 504. Membrane 542 represents a water-impermeable material that seals top compartment 502 analogously to separator 540 of travel case 500 and that is designed to fail subsequently to foaming agent cartridges 531. For example, membrane 542 can be made of a material and of dimensions so as to remain intact at the threshold temperature or threshold range of temperatures at which foaming agent cartridges 531 are designed to fail yet fail under an increase in pressure within top compartment 502 of travel case 550 as a result of one or more of foaming agent cartridges 531 releasing their contents (e.g., a pressurized inert gas). In another example, to fail at a higher temperature than foaming agent cartridges 531, membrane 542 is made of a temperature-dependent breakdown material having a higher threshold temperature or threshold range of temperatures than foaming agent cartridges 531 and/or has increased thickness compared to wall thicknesses of foaming agent cartridges 531.

Scaffold 552 is advantageously made of a rigid material (e.g., a hard plastic or metal alloy) and attached to top compartment 502 such that scaffold 552 supports membrane 542 against the weight of water contained within top compartment 502. In addition to enabling water, foam, and foaming agents to flow between top compartment 502 and bottom compartment 504, it is advantageous to design apertures 554 in scaffold 552 such that they act as stress concentrators with respect to membrane 542. For example, concentrating stress within membrane 542 at edges of apertures 554 can promote fracturing and/or tearing of membrane 543 at the edges of apertures 554 under pressure from the contents of foaming agent cartridges 531.

Figure 5F:
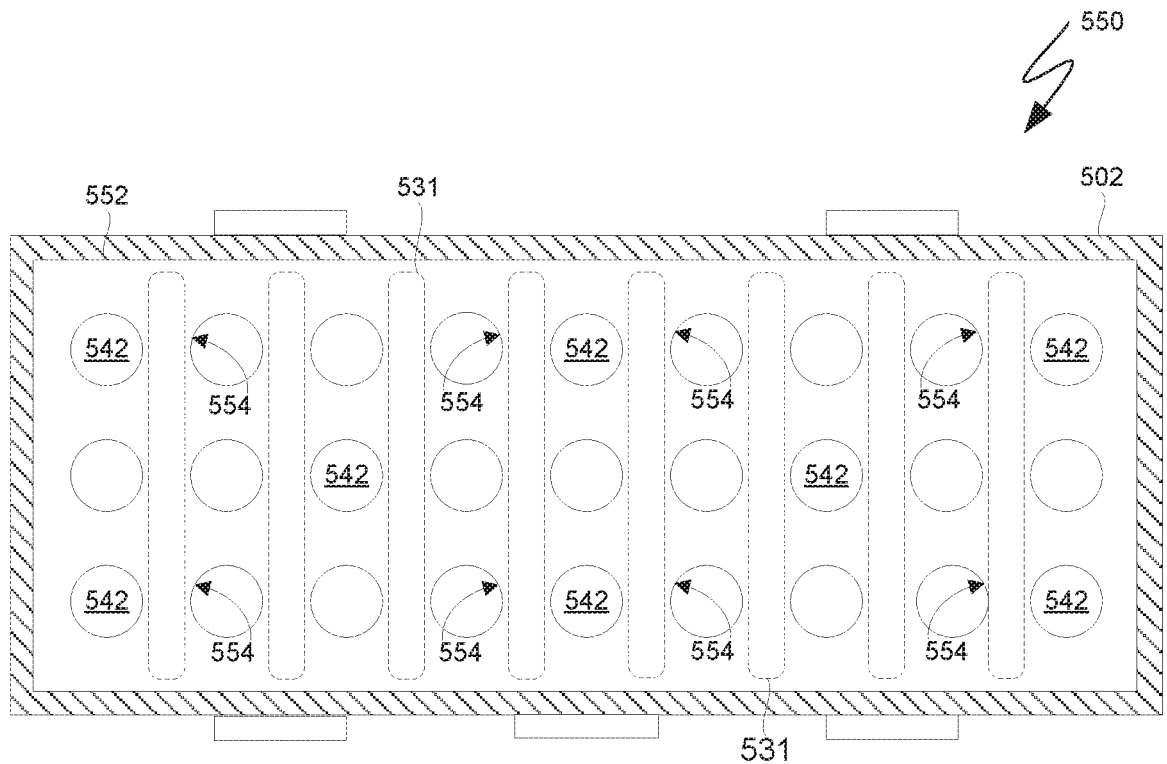
FIG. 5F is a perspective view of the schematic diagram of the Li-ion battery travel case depicted in FIG. 5E showing a bottom-up view of the top compartment of the Li-ion battery travel case along line B-B, as depicted in FIG. 5E, in accordance with an embodiment of the present invention.

FIG. 5F is a perspective view of the schematic diagram of the Li-ion battery travel case depicted in FIG. 5E showing a bottom-up view of the top compartment of the Li-ion battery travel case along line B-B, as depicted in FIG. 5E, in accordance with an embodiment of the present invention.

In the embodiment depicted in FIG. 5F, a plurality of foaming agent cartridges 531 are arranged within top compartment 502 such that apertures 554 of scaffold 552 lie to either side of each foaming agent cartridge. Foaming agent cartridges 531 are shown in outline form because they are hidden by membrane 542 and scaffold 552. Embodiments of the present invention, however, are not to be construed as being limited to the number, arrangement, or size of foaming agent cartridges 531 depicted in FIGS. 53-5G. Apertures 554 of scaffold 552 expose portions of membrane 542.

Figure 5G:
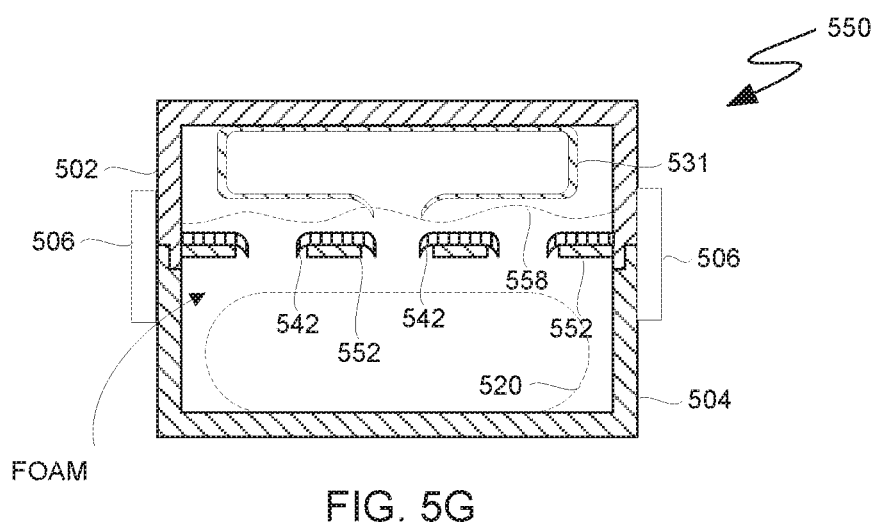
FIG. 5G is a cross-sectional schematic diagram on the embodiment of the Li-ion battery travel case depicted in FIG. 5E depicting the Li-ion battery travel case following generation of a fire-fighting foam, in accordance with an embodiment of the present invention.

FIG. 5G is a cross-sectional schematic diagram of the embodiment of the Li-ion battery travel case depicted in FIG. 5E depicting the Li-ion battery travel case following generation of a fire-fighting foam, in accordance with an embodiment of the present invention. More specifically, FIG. 5G depicts foaming agent cartridges 531 and membrane 542 in failed states.

In some embodiments, mixing of the foaming agent contained within foaming agent cartridges 531 and the water contained with top compartment 502 by membrane 542 occurs prior to membrane 542 failing. For example, pressurized inert gas within foaming agent cartridges 531 can promote initial mixing of the foaming agent and the water, and while straining membrane 542, the pressure applied by the inert gas does not cause membrane 542 to fail; additional heat generated by battery 520 and/or additional gas generated by chemical reactions caused by the mixing of the contents of foaming agent cartridges 531 eventually causes membrane 542 to fail and apply the two-component firefighting foam to battery 520. In other embodiments, failure of membrane 542 is caused by the failure of foaming agent cartridges 531 and mixing of the foaming agent and water occurs within top compartment 502 and bottom compartment 504. Combustion products resulting from the failure of battery 520 can further mix and aerate the resulting foam.

Considerations with respect to sizing top compartment 502 of travel case 550 and bottom compartment 504 of travel case 550, as well as to the amount of water and foaming agent provided, are analogous to those for travel case 500.

Figure 6A:
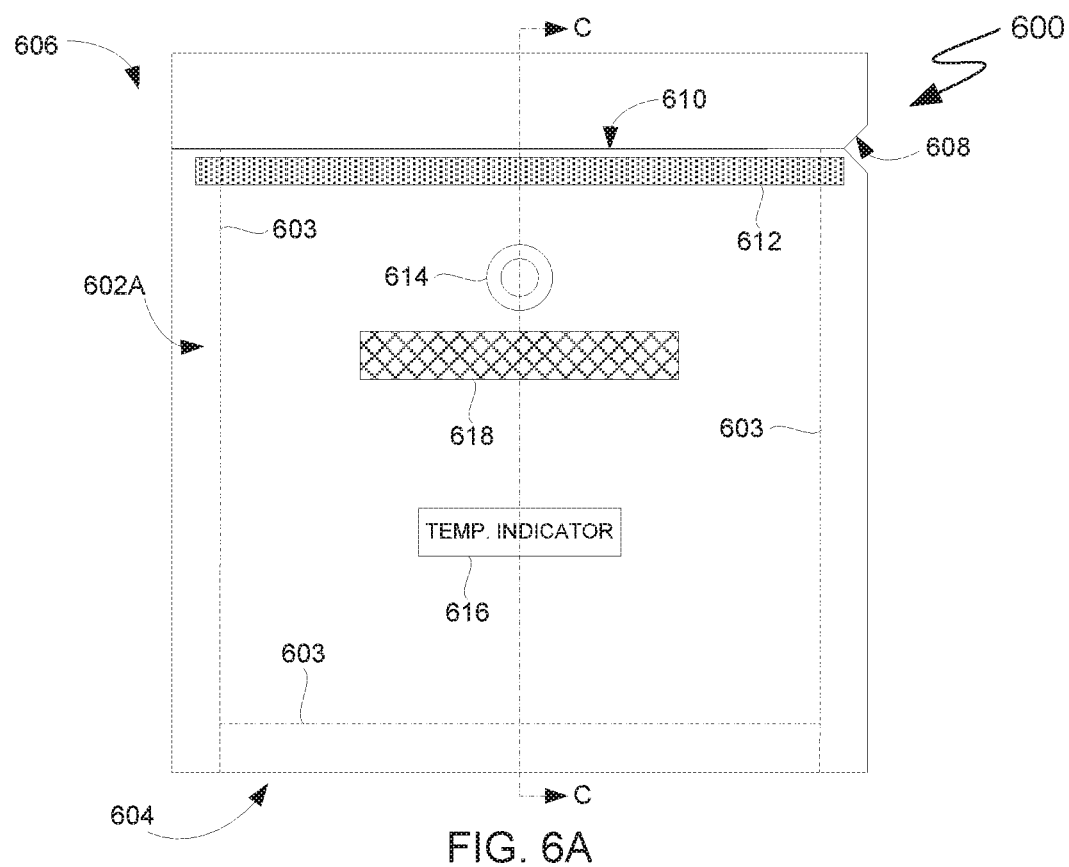
FIG. 6A is a schematic diagram depicting a view of a single-use containment pouch, in accordance with an embodiment of the present invention.

FIG. 6A is a schematic diagram depicting a view of a single-use containment pouch, in accordance with an embodiment of the present invention. More specifically, FIG. 6A depicts single-use containment pouch 600 that can be used to contain a Li-ion battery experiencing thermal runaway and suppress and/or extinguish a resulting fire.

In the embodiment depicted in FIG. 6A, single-use containment pouch 600 is formed by side panels 602 (i.e., front panel 602A and back panel 602B (back panel 602B is not shown)) that are joined together at their sides such that two of seems 603 represent, in part, an interface of front panel 602A and back panel 602B. Side panels 602 are each joined to bottom panel 604 to form a sealed pouch. One seem of seems 603 represents an interface of bottom panel 604 and side panels 602. The top portions of side panels 602 are similarly joined together to form tear top 606. Tear top 606 includes tear notch 608. A bottom edge of tear top 606 is defined, at least in part, by tear line 610. Tear line 610 represents a feature that enables an individual to open single-use containment pouch 600 along tear line 610 (e.g., a snap closure, a shearable region, a zip closure, and other forms of openable seals known in the art). The embodiment depicted in FIG. 6A contemplates a user tearing off tear top 606 along tear line 610, beginning at tear notch 608. Embodiments of the present invention, however, are not to be construed as being limited to requiring a "tearing" motion to open single-use containment pouch 600. The embodiment depicted in FIG. 6A can be resealed by rolling back panel 602B onto the portion of front panel 602A including adhesive strip 612. Other embodiments can use other methods of resealing single-use containment pouch 600, and in some embodiments, the method of opening single-use containment pouch 600 can also facilitate resealing single-use containment pouch 600. As described in greater detail subsequently, single-use containment pouch 600 is designed, in an unopened condition, to hold a quantity of water. Accordingly, it is advantageous that single-use pouch 600 be constructed (e.g., with respect to seems 603) so as to be substantially leak resistant and that the elements that facilitate opening and/or resealing single-use containment pouch 600 be leak-resistant.

Single-use containment pouch 600 is analogous to travel cases 500 and 550 at least in that single-use pouch is designed to hold a single battery or single battery-containing electronic device of a given size (but may hold multiple batteries and/or electronic devices that are smaller than the given size). Similarly, individuals may wish to inspect and/or handle single-use containment pouch 600 after depositing a battery or electronic device into single-use containment pouch 600. Additionally, individuals may need to grasp single-use containment pouch 600 in order to reseal single-use containment pouch 600 after depositing a battery or electronic device into it. It is therefore advantageous to construct single-use containment pouch 600, at least in part, using thermally insulative materials Like travel cases 500 and 550, single-use containment pouch 600 can be constructed (e.g., side panels 602 and bottom panel 604) of a material or multiple materials (e.g., a composite material) that retain strength at temperatures generated by failing Li-ion batteries, insulate exterior surfaces of single-use containment pouch 600 from such temperatures, and resists punctures and abrasions from normal use. While embodiments of single-use containment pouch 600 can be rigid or substantially rigid, it is advantageous that single-use containment pouch 600 be constructed of more flexible materials. For example, single-use containment pouch 600 can be used aboard passenger vehicles (e.g., commercial aircraft) in the event that a passenger's Li-ion battery or Li-ion battery-containing electronic device begins to fail. Constructing single-use containment pouch 600 from flexible materials (e.g., for side panels 602 and bottom panel 604) can enable storage of single-use containment pouch 600 in irregularly-shaped locations (e.g., seat-back pockets), thereby potentially increasing the number of instances of single-use containment pouch 600 that can be stored and/or increasing the number locations in which single-use containment pouch 600 can be stored.

Like pressure relief valve 508 of travel cases 500 and 550, the embodiment of single-use containment pouch 600 depicted in FIG. 6A includes pressure relief valve 614 on front panel 602A to moderate pressure within single-use containment pouch 600. Pressure relief valve 614 is analogous to pressure relief valve 508. Similarly, the embodiment of single-use containment pouch 600 depicted in FIG. 6A includes temperature indicator 616 on front panel 602A. Temperature indicator 616 is analogous to temperature indicator 516. Additionally, embodiments of single-use containment pouch 600 can include a pair of heat-resistant gloves (not shown) to facilitate handling of single-use containment pouch 600 following its use. Hook-and-loop strip 618 represents a patch of hook material or a patch of loop material on front panel 602A that allows for a pair of heat-resistant gloves having an opposite type of hook-and-loop material to be attached to the exterior of single-use containment pouch 600 for potential re-use. Hook-and-loop strip 618 can represent other types of reusable attachment material (e.g., a reusable adhesive strip) or fastener known in the art to attach a pair of heat-resistant gloves to the exterior of single-use containment pouch 600.

Figure 6B:
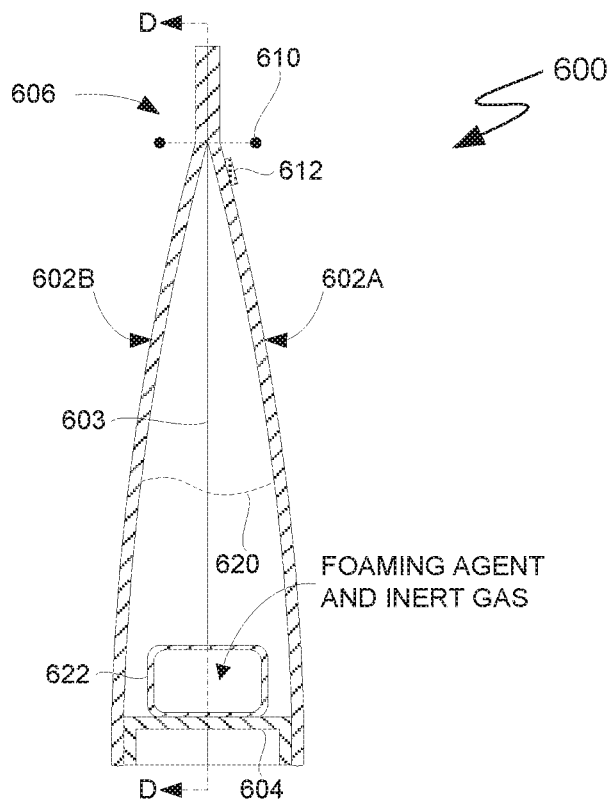
FIG. 6B is a cross-sectional view of the schematic diagram of single-use containment pouch depicted in FIG. 6A along line C-C, as depicted in FIG. 6A, in accordance with an embodiment of the present invention.

FIG. 6B is a cross-sectional view of the schematic diagram of the single-use containment pouch depicted in FIG. 6A along line C-C, as depicted in FIG. 6A, in accordance with an embodiment of the present invention. More specifically, FIG. 6B depicts an interior of single-use containment pouch 600 when single-use containment pouch 600 is in an unopened condition. Pressure relief valve 614, temperature indicator 616, and hook-and-loop strip 618 are omitted from FIG. 6B for illustrative simplicity.

Water level 620 defines a surface of a quantity of water contained by single-use containment pouch 600. If single-use containment pouch 600 (e.g., side panels 602 and bottom panel 604) is constructed of flexible material(s), water level 620 can rise and fall as single-use containment pouch 600 is bent and/or squeezed. When using single-use containment pouch 600, an individual places a failing battery and/or electronic device into the water contained within single-use containment pouch 600. Accordingly, it is advantageous that the quantity of water contained within single-use containment pouch 600 not be so great that water level 620 exceeds the level of tear line 610 in anticipated usage scenarios (i.e., based on the anticipated types and sizes of batteries and/or electronic devices). The individual can reseal the embodiment of single-use containment pouch 600 depicted in FIG. 6B by rolling a portion of back panel 602B and the portion of front panel 602A including adhesive strip 612 (side panels 602 are joined at two of seems 603) forward such that adhesive strip 612 contacts and adheres to a lower portion of front panel 602A. In some embodiments, additional material is provided (e.g., a flap of similar construction to side panels 602) to aid in resealing single-use containment pouch 600. Different sizes of single-use containment pouch 600 can be used to accommodate batteries and electronic devices of a range of types and sizes.

In the embodiment depicted in FIG. 6B, single-use containment pouch 600 includes foaming agent cartridge 622 to facilitate the generation of a two-component fire-fighting foam. Foaming agent cartridge 622 is analogous to foaming agent cartridges 530 and 531, as described with respect to FIGS. 5C-5G, in purpose, construction, and function. In the embodiment depicted in FIGS. 6A-6F, foaming agent cartridge 622 to attached to bottom panel 604 using any one of, or a combination of, mechanical fastener(s), chemical fastener(s), electromagnetic fastener(s), or other types of fasteners known in the art. In other embodiments, foaming agent cartridge is not attached to any portion of single-use containment pouch 600 and floats in the water contained within single-use containment pouch 600. Embodiments of the present invention are not to be construed as being limited to the number or arrangement of foaming agent cartridges depicted in FIGS. 6B-6F.

Figure 6C:
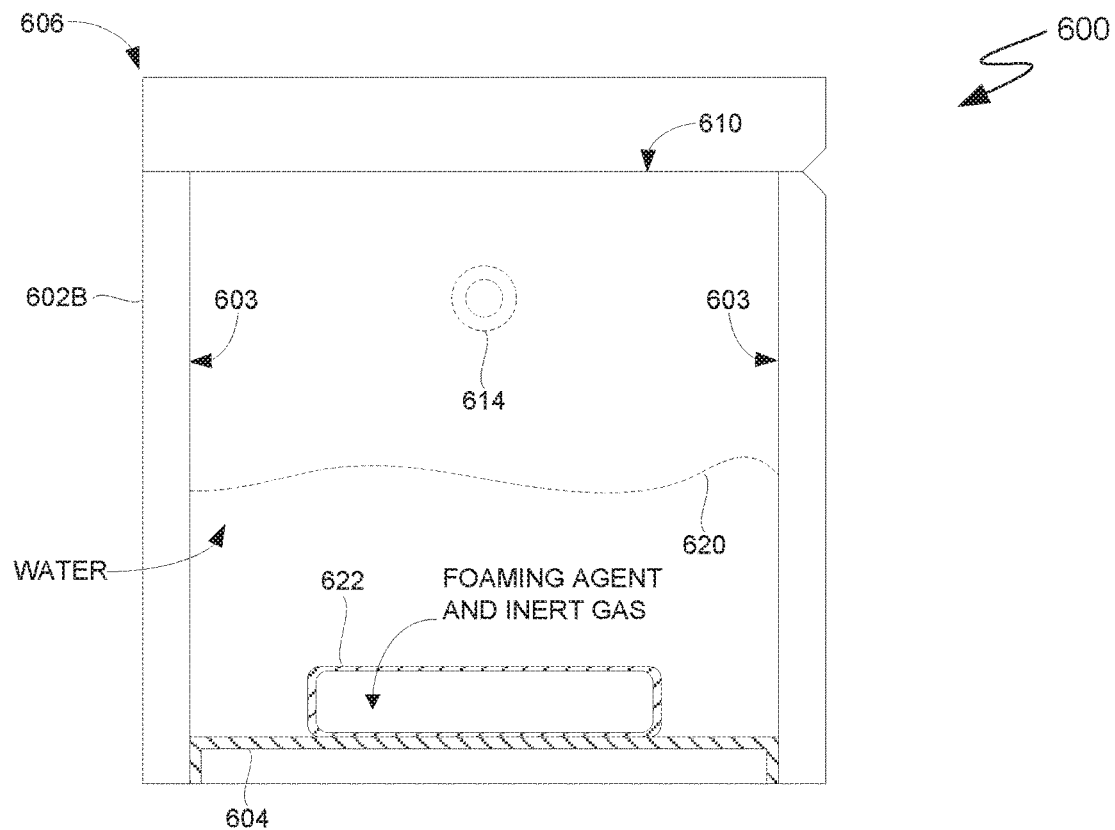
FIG. 6C is a cross-sectional view of the schematic diagram of the single-use containment pouch depicted in FIGS. 6A and 6B along line D-D, as depicted in FIG. 6B, in accordance with an embodiment of the present invention.

FIG. 6C is a cross-sectional view of the schematic diagram of the single-use containment pouch depicted in FIGS. 6A and 6B along line D-D, as depicted in FIG. 6B, in accordance with an embodiment of the present invention. More specifically, FIG. 6C depicts a cross-sectional view through foaming agent cartridge 622 when single-use containment pouch 600 is in an unopened condition. In the embodiment depicted in FIG. 6C, foaming agent cartridge 622 is filled with a foaming agent and a pressurized inert gas, analogously to foaming agent cartridges 530 and 531. Water surrounds foaming agent cartridge 622 and rises to water level 620 within single-use containment pouch 600, which is sealed, at least in part, at seems 603 and along tear line 610 of tear top 606. Pressure relief valve 614 is shown, in outline form, to provide an exemplary point of reference for water level 620.

Figure 6D:
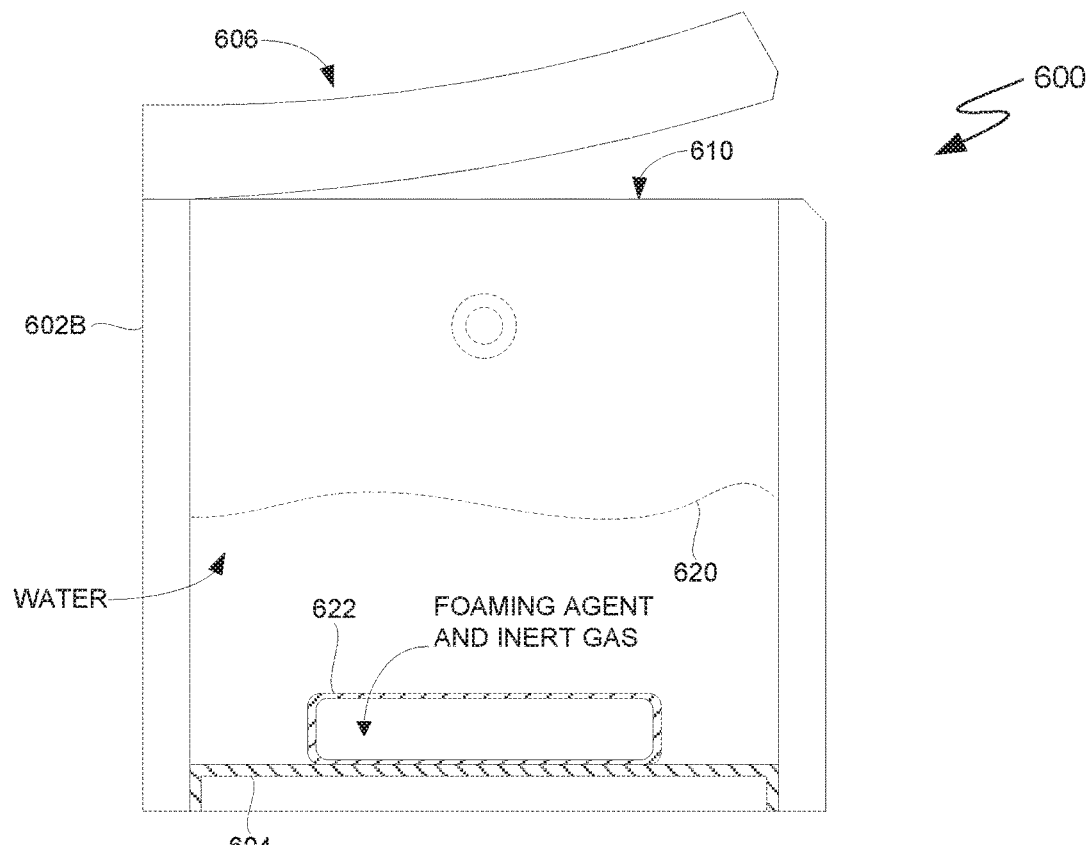
FIG. 6D is the cross-sectional view of the schematic diagram of the single-use containment pouch depicted in FIG. 6C showing a tear top of the single-use containment pouch in a partially torn position, in accordance with an embodiment of the present invention.

FIG. 6D is the cross-sectional view of the schematic diagram of the single-use containment pouch depicted in FIG. 6C showing a tear top of the single-use containment pouch in a partially torn position, in accordance with an embodiment of the present invention. More specifically, FIG. 6C depicts a cross-sectional view through foaming agent cartridge 622 when single-use containment pouch 600 is in a partially-opened condition. In the embodiment depicted in FIG. 6C, single-use containment pouch 600 is opened by shearing, beginning at tear notch 608, tear top 606 along tear line 610 with respect to the lower portion of front panel 602A (not shown) and back panel 602B.

Figure 6E:
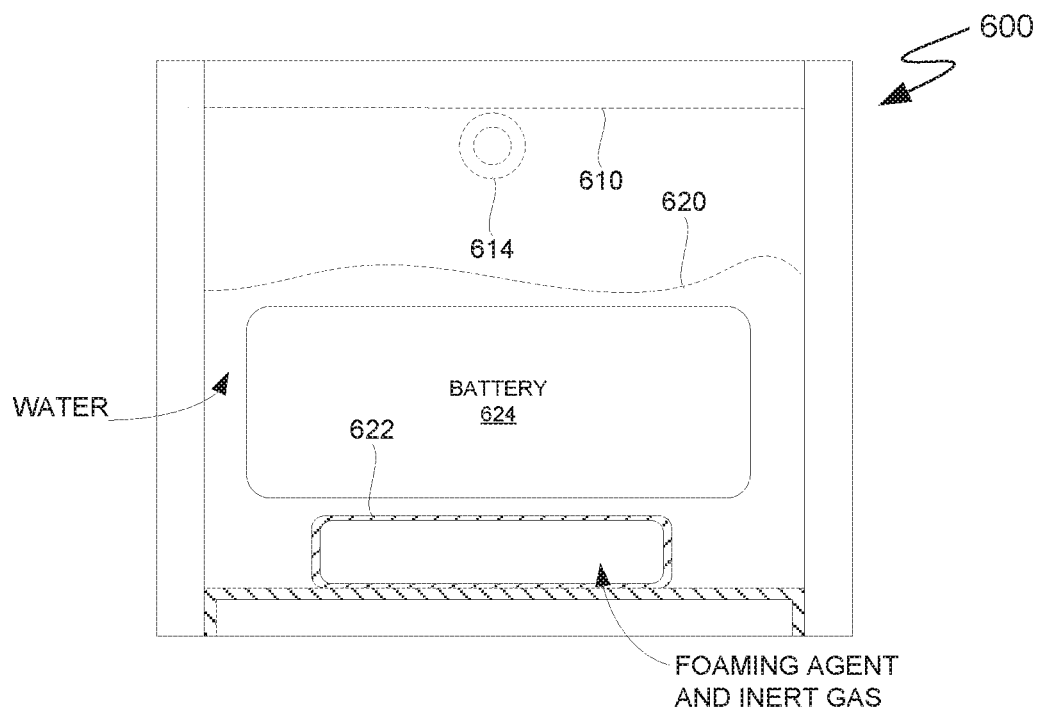
FIG. 6E is the cross-sectional view of the schematic diagram of the single-use containment pouch depicted in FIG. 6D showing a battery within the resealed single-use containment pouch in accordance with an embodiment of the present invention.

FIG. 6E is the cross-sectional view of the schematic diagram of the single-use containment pouch depicted in FIG. 6D showing a battery within the resealed single-use containment pouch in accordance with an embodiment of the present invention. More specifically, FIG. 6E shows battery 624 deposited into water within single-use containment pouch 600.

Depositing battery 624 into the water within single-use containment pouch 600 raises water level 620 (e.g., as shown with respect to the outline pressure relief valve 614 between FIGS. 6D and 6E). If battery 624 is experiencing thermal runaway, the heat produced by battery 624 will raise the temperature of the water within single-use containment pouch 600. In FIG. 6D, the temperature of the water within single-use containment pouch 600 does not yet exceed the threshold temperature or threshold range of temperatures at which foaming agent cartridge 622 is designed to fail. In the embodiment depicted in FIG. 6E, tear line 610 is shown in outline form to represent the location of tear line 610 as a result of resealing single-use containment pouch as described with respect to FIG. 6A.

Figure 6F:
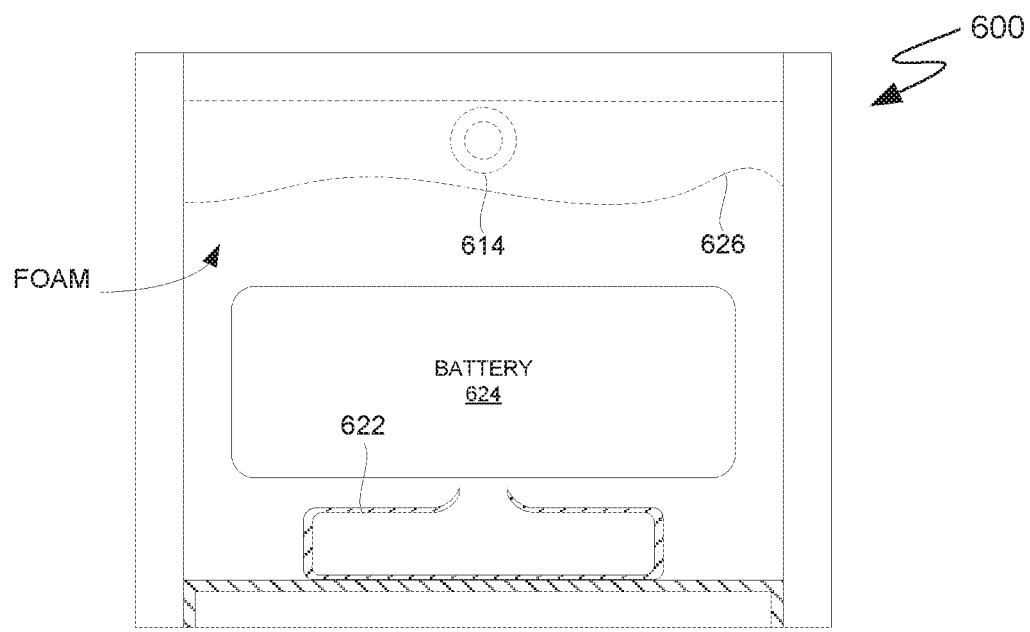
FIG. 6F is the cross-sectional view of the schematic diagram of the single-use containment pouch depicted in FIG. 6E showing a ruptured foaming agent cartridge and a fire-fighting foam coating the battery within the resealed single-use containment pouch in accordance with an embodiment of the present invention.

FIG. 6F is the cross-sectional view of the schematic diagram of the single-use containment pouch depicted in FIG. 6E showing a ruptured foaming agent cartridge and a fire-fighting foam coating the battery within the resealed single-use containment pouch in accordance with an embodiment of the present invention. More specifically, FIG. 6F shows foaming agent cartridge 622 in a ruptured condition and the resulting two-component foam that coats battery 624. As discussed with respect to FIGS. 5C-5G, pressurized inert gas released from foaming agent cartridge 622 following the failure of foaming agent cartridge 622 can advantageously promote mixing of the foaming agent with the water within single-use containment pouch 600 and aerate the resulting foam. If safe to do so, an individual may also lightly shake single-use containment pouch 600 to promote mixing of the foaming agent and water and aeration of the foam.

In general, single-use containment pouch 600 is sized to contain an amount of water that can generate sufficient foam to coat the anticipated sizes and types of batteries and/or electronic devices and fill or partially fill single-use containment pouch 600. Foam level 626 represents a height of the foam within single-use containment pouch 600 at a point in time. Foam level 626 can changes based, at least in part, on the expansion ratio of the foam. Sizing single-use containment pouch 600 is analogous to sizing travel case 500 and travel case 550. Additionally, single-use containment pouch 600 is advantageously constructed to resist pressure resulting from one of, or a combination of, the release of pressurized inert gas from foaming agent cartridge 622, gas produced as a result of the foaming agent mixing with the water, and combustion products resulting from the failure of battery 624. Pressure relief valve can advantageously moderate pressures within single-use containment pouch 600 as previously described.

Figure 7A:
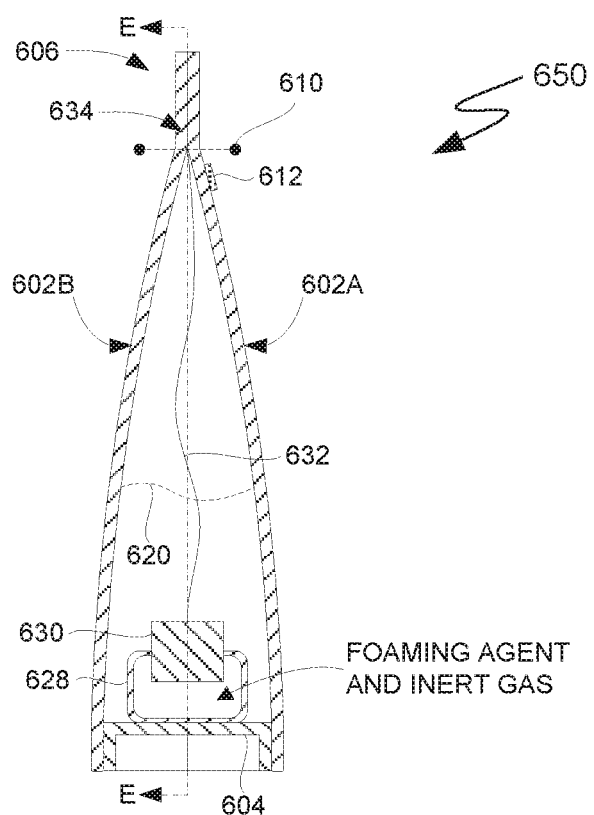
FIG. 7A is a cross-sectional view of a schematic diagram depicting a view of a single-use containment pouch, in accordance with an embodiment of the present invention.

FIG. 7A is a cross-sectional view of a schematic diagram depicting a view of a single-use containment pouch, in accordance with an embodiment of the present invention. More specifically, FIG. 7A depicts single-use containment pouch 650 that can be used to contain a Li-ion battery experiencing thermal runaway and suppress and/or extinguish any resulting fire.

The embodiment of single-use containment pouch 650 depicted in FIG. 7A is substantially similar to embodiment of single-use containment pouch 600 depicted in FIGS. 6A-6F, at least with respect to its exterior features, construction, and intended purpose. For example, the embodiment of single-use containment pouch 650 depicted in FIG. 7A is constructed by joining front panel 602A, back panel 602B, and bottom panel 604 along seems 603 and an individual can reseal single-use containment pouch 600 using adhesive strip 612. Pressure relief valve 614, temperature indicator 616, and hook-and-loop strip 618 are omitted from FIG. 7A for illustrative simplicity. Single-use containment pouch 650, however, differs from single-use containment pouch 600, at least in part, in the way in which a foaming agent and water are mixed. For example, FIG. 7A depicts obturated foaming agent cartridge 628 in place of foaming agent cartridge 622. Water surrounds obturated foaming agent cartridge 628 and has a surface defined by water level 620. Obturator 630 obstructs an aperture in obturated foaming agent cartridge 628 and is attached to tether 632, which flexibly attaches obturator 630 to tear top 606. Tether 632 is anchored to tear top 606, above tear line 610, at tether anchor 634. In various embodiments, tether anchor 634 represent a point at which tether 632 is attached to top portions of one or both of front panel 602A and back panel 602B (i.e., the portions of side panels 602 that form tear top 606) by any type of fastener known in the art.

Figure 7B:
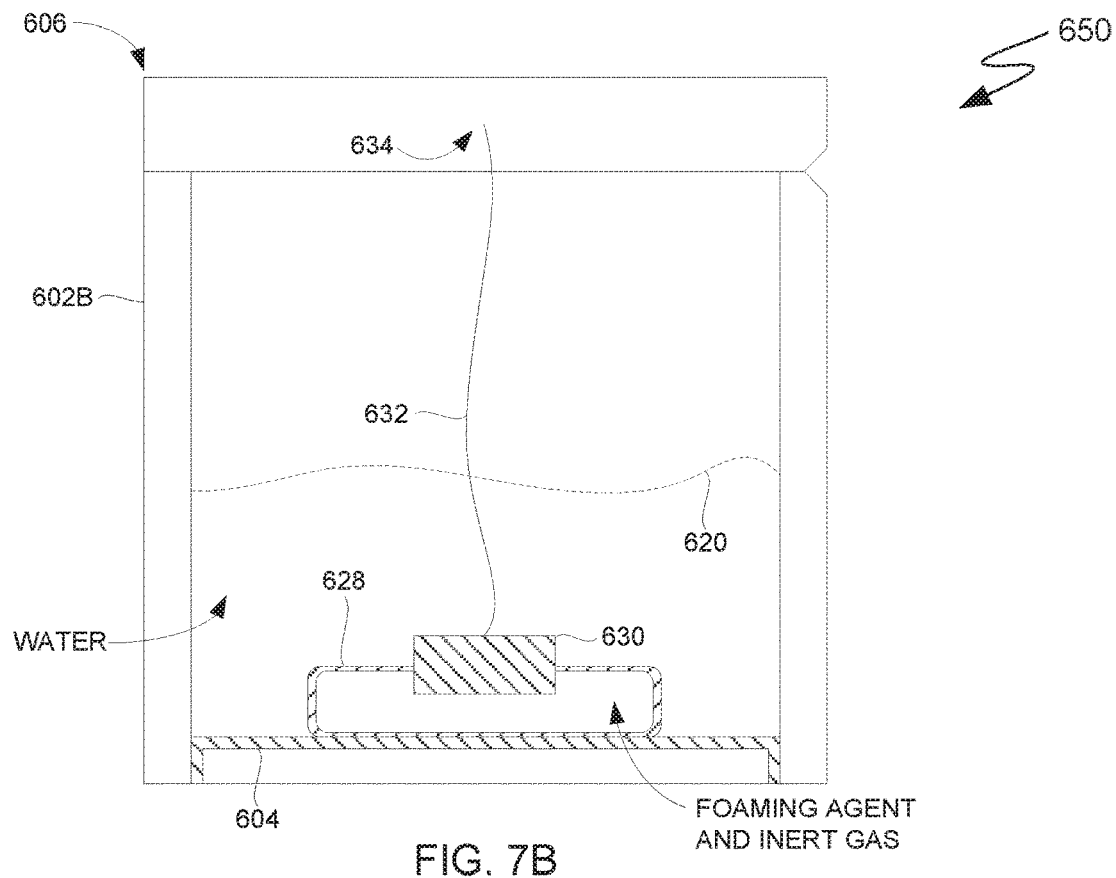
FIG. 7B is a cross-sectional view of the schematic diagram of the single-use containment pouch depicted in FIG. 7A along line E-E, as depicted in FIG. 7A, in accordance with an embodiment of the present invention.
Figure 7C:
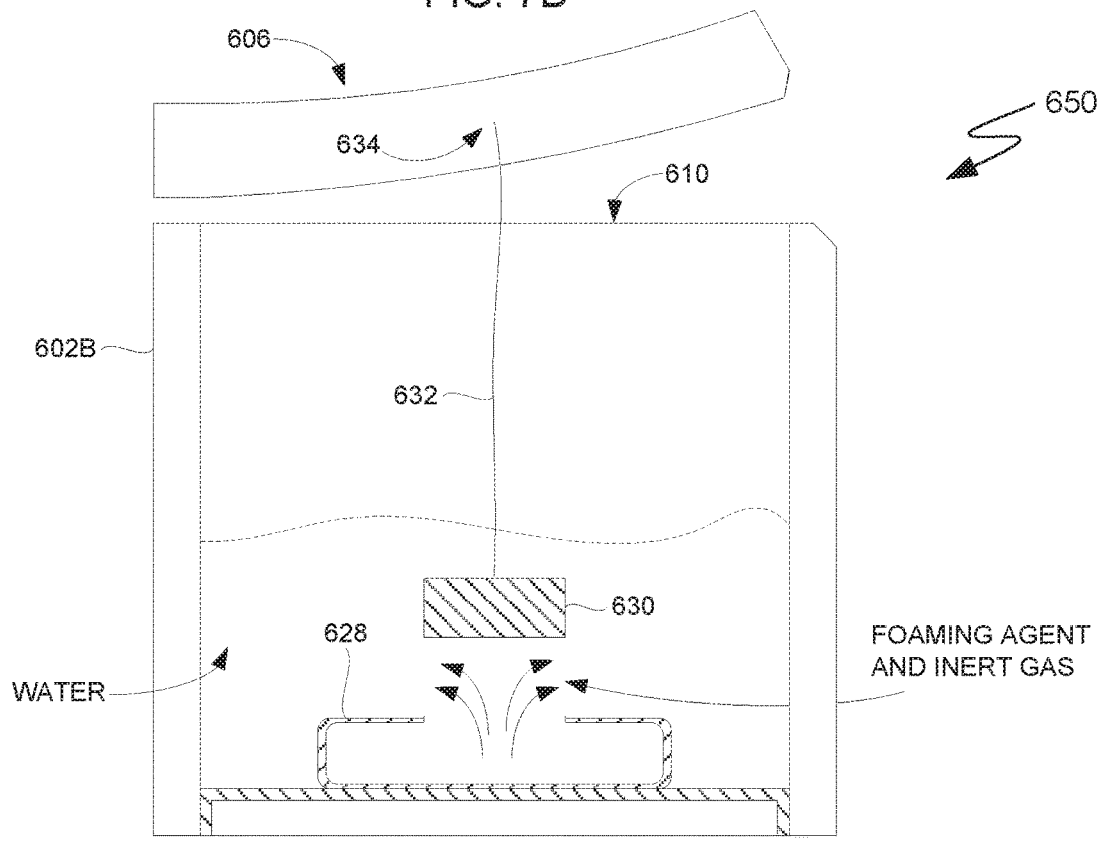
FIG. 7C is the cross-sectional view of the schematic diagram of the single-use containment pouch depicted in FIG. 7B showing a tear top of the single-use containment pouch in a torn position and a release of foaming agent and inert gas, in accordance with an embodiment of the present invention.

Embodiments of the present invention are not be construed as being limited to the arrangement, number, or size of obturated foaming cartridges, obturators, and tethers depicted in FIGS. 7A-7C.

FIG. 7B is a cross-sectional view of the schematic diagram of the single-use containment pouch depicted in FIG. 7A along line E-E, as depicted in FIG. 7A, in accordance with an embodiment of the present invention. More specifically, FIG. 7B depicts obturator 630 preventing the release of a foaming agent a pressurized inert gas from obturated foaming agent cartridge 628 when single-use containment pouch 650 is in an unopened condition.

In the embodiment depicted in FIG. 7B, obturated foaming agent cartridge 628 is constructed so as to resist the pressure of the pressurized inert gas when submerged in water (i.e., below water level 620), and thereby contain the foaming agent, when one or more apertures in obturated foaming agent cartridge 628 are obstructed by obturator 630. In some embodiments, obturated foaming agent cartridge 628 is constructed to merely contain the foaming agent when submerged in water (i.e., for embodiments in which obturated foaming agent cartridge 628 does not contain a pressurized inert gas). Obturator 630 is constructed and inserted, at least in part, into one or more apertures of obturated foaming agent cartridge 628 so as to prevent the release of the foaming agent and inert gas when single-use pouch 650 is in an unopened condition. In some embodiments, frictional forces are sufficient to retain obturator 630 within the aperture(s) of obturated foaming agent cartridge 628. In other embodiments one or a combination of mechanical fastener(s), chemical fastener(s), and electromagnetic fastener(s) are used to retain obturator 630 within the aperture(s) of obturated foaming agent cartridge 628 when single-use pouch 650 is in an unopened condition. Similarly, obturated foaming agent cartridge 628 can be attached to bottom panel 604 by various types of fastener known in the art. In some embodiments, obturator 630 and obturated foaming agent cartridge 628 represents a pocket in bottom panel 604, in which case obturator 630 can be constructed similarly to bottom panel 604 and is removably sealed to bottom panel 604 around its edges to contain the foaming agent; obturator 630 can be "peeled" away from bottom panel 604 via tether 632.

Tether 632 is constructed so as to permit an individual to apply sufficient force to tether 632 to dislodge obturator 630 from the aperture(s) of obturated foaming agent cartridge 628 and thereby release the foaming agent and pressurized inert gas within. In various embodiments, tether 632 is made from a flexible material. Additionally, it is advantageous for tether 632 to have sufficient length and/or elasticity to permit single-use pouch 650 to be bent or squeezed without causing tether 632 to apply significant force to obturator 630 or tether anchor 634. Tether 632 can be attached to obturator 630 and tether anchor 634 of tear top 606 (e.g., a tope portion of back panel 602B) by any means known in the art that enables an individual to transmit sufficient force to obturator 630 to dislodge obturator 630 from the aperture(s) of obturated foaming agent cartridge 628.

FIG. 7C is the cross-sectional view of the schematic diagram of the single-use containment pouch depicted in FIG. 7B showing a tear top of the single-use containment pouch in a torn position and a release of foaming agent and inert gas, in accordance with an embodiment of the present invention. More specifically, FIG. 7C depicts obturator 630 in a dislodged position as a result of an individual displacing tear top 606 with respect to a lower portion of single-use pouch 650 enough to dislodge obturator 630 from the aperture(s) of obturated foaming agent cartridge 628.

In various embodiments, the required displacement of tear top 606 is based, at least in part, on the length of tether 632 and the displacement of obturator 630 required to dislodge obturator 630. Anchoring tether 632 to tear top 606 at tether anchor 634 is advantageous in that the act of opening single-use pouch 650 along tear line 610 triggers the release of the foaming agent from obturated foaming agent cartridge 628. In some embodiments, however, tether 632 has a free end that is removably attached to an interior surface of side panels 602 (e.g., back panel 602B or front panel 602A (not shown)), in which case opening single-use pouch 650 and dislodging obturator 630 are separate acts that can enable an individual to place a failing battery into single-use pouch 650 before releasing the foaming agent from obturated foaming agent cartridge 628. In embodiments in which tether 632 is anchored to tear top 606 (i.e., embodiment in which opening single-use pouch 650 causes the release of the foaming agent), it is advantageous to include a chemical buffer and/or utilize surfactants and additives that can delay foam generation or moderate initial foam generation. Delaying or moderating foam generation can give an individual additional time to place a failing battery within single-use pouch 650 and reseal single-use pouch 650, thereby reducing the risk of foam escaping single-use pouch 650. Omitting a pressurized inert gas from obturated foaming agent cartridge 628 can similarly moderate initial foam production. In various embodiments, an individual may also shake single-use containment pouch 600, if safe to do so, in order to promote mixing of the foaming agent and water and aeration of the foam. Generation of foam, the moderation of thermal runway, and the suppression and/or extinguishing of any resulting fires is otherwise proceeds similarly as with respect to the embodiment depicted in FIGS. 6E and 6F.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. An apparatus for automatically generating a fire-fighting foam at elevated temperatures, the apparatus comprising: a container sized to hold at least one battery; water stored within the container; and one or more cartridges stored within the container, the one or more cartridges made, at least in part, of a temperature-dependent breakdown material and containing a foaming agent, wherein the one or more cartridges is at least partially submerged in the water, and wherein heat generated by a failing battery is sufficient to cause the temperature-dependent breakdown material to fail such that the foaming agent is released from at least one cartridge to mix with the water stored within the container.

2. The apparatus of claim 1, further comprising:
   a pressurized inert gas stored within the one or more cartridges.

3. The apparatus of claim 1, the container further comprising:
   a bottom compartment that is sized to hold the at least one battery; and
   a top compartment that is attached to the bottom compartment so as to permit insertion and removal of the at least one battery from the bottom compartment, the top compartment storing the water behind one or more members that seal the top compartment such that, when the container is sealed, the heat generated by the failing battery is sufficient to result in the release of the water into the bottom compartment of the container.

4. The apparatus of claim 3, wherein:
   the bottom compartment stores the one or more cartridges; and
   the one or more members sealing the top compartment are one or more separators made, at least in part, of the temperature-dependent breakdown material such that, when the container is sealed, the heat generated by the failing battery causes the temperature-dependent breakdown material to fail and release the water into the bottom compartment to mix with the foaming agent.

5. The apparatus of claim 4, wherein the one or more cartridges are made of a first temperature-dependent breakdown material that fails at a first threshold temperature and the one or more separators are made of a second temperature-dependent breakdown material that fails at a second threshold temperature that is lower than the first threshold temperature such that water is released into the bottom compartment prior to the at least one cartridge releasing the foaming agent.

6. The apparatus of claim 3, wherein:
   the top compartment stores the one or more cartridges such that, when the container is sealed, the heat generated by the failing battery causes the one or more cartridges to rupture and release the foaming agent into the top compartment to mix with the water; and
   the one or more members that seal the top compartment are one or more membranes that fail subsequently to the one more cartridges such that failure of the one or more membranes releases a foam into the bottom compartment.

7. The apparatus of claim 6, wherein the one or more cartridges are made of a first temperature-dependent breakdown material that fails at a first threshold temperature and the one or more membranes are made of a second temperature-dependent breakdown material that fails at a second threshold temperature that is higher than the first threshold temperature such that the at least one cartridge fails prior to the one or more membranes as a temperature increase beyond the first threshold temperature.

8. The apparatus of claim 6, further comprising:
   a scaffold that is attached to the top compartment and having a plurality of apertures that enable the foam, at least in part, to flow from the top compartment into the bottom compartment subsequent to the failure of the one or more membranes.

9. An apparatus for automatically generating fire-fighting foams at elevated temperatures, the apparatus comprising: a flexible and resealable container sized to hold at least one battery and having a removable top portion; water stored within the container; and one or more cartridges stored within the container and in contact, at least in part, with the water, the one or more cartridges made, at least in part, of a temperature-dependent breakdown material and containing a foaming agent, wherein the one or more cartridges is at least partially submerged in the water, and wherein heat generated by a failing battery is sufficient to cause the temperature-dependent breakdown material to fail such that the foaming agent is released to mix with the water stored within the container.

10. The apparatus of claim 9, wherein tearing the removable top portion along a tear line opens the container to permit the failing battery to be deposited into the water stored within the container.

11. The apparatus of claim 9, further comprising:
   a pressurized inert gas stored within the one or more cartridges.

12. The apparatus of claim 11, wherein the one or more cartridges fail at or above a threshold temperature that corresponds to a temperature at which the temperature-dependent breakdown material yields under pressure from the pressurized inert gas stored within the one or more cartridges.

13. The apparatus of claim 12, further comprising:
   a pressure relief valve that is attached to a side panel of the container.

* * * * *